United States Patent
Takahashi et al.

(10) Patent No.: US 12,498,028 B2
(45) Date of Patent: Dec. 16, 2025

(54) TRANSMISSION STRUCTURE

(71) Applicant: KANZAKI KOKYUKOKI MFG. CO., LTD., Amagasaki (JP)

(72) Inventors: Takumi Takahashi, Amagasaki (JP); Kohei Ogura, Amagasaki (JP); Fumiaki Ito, Amagasaki (JP); Tasuku Inoue, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 86 days.

(21) Appl. No.: 18/619,295

(22) Filed: Mar. 28, 2024

(65) Prior Publication Data

US 2024/0328490 A1 Oct. 3, 2024

(30) Foreign Application Priority Data

Apr. 3, 2023 (JP) ................................. 2023-059816

(51) Int. Cl.
*F16H 47/04* (2006.01)
*B60W 30/18* (2012.01)
(Continued)

(52) U.S. Cl.
CPC ..... *F16H 37/022* (2013.01); *B60W 30/18072* (2013.01); *F16H 61/04* (2013.01);
(Continued)

(58) Field of Classification Search
CPC .......... F16H 47/04; F16H 61/30; F16H 61/46; F16H 61/682; F16H 37/022; F16H 59/40;
(Continued)

(56) References Cited

U.S. PATENT DOCUMENTS

| 2011/0178684 A1* | 7/2011 | Umemoto | ............. F16H 61/431 477/115 |
| 2016/0368499 A1* | 12/2016 | Kimura | ................. B60W 30/20 |
| 2020/0124170 A1 | 4/2020 | Iwaki et al. | |

FOREIGN PATENT DOCUMENTS

JP 2007091091 A * 4/2007 ............. B62D 11/08

\* cited by examiner

*Primary Examiner* — Tinh Dang
(74) *Attorney, Agent, or Firm* — CANTOR COLBURN LLP

(57) ABSTRACT

[Problem] A transmission structure that may improve a traveling feeling when a drive traveling state is interrupted in traveling and then the drive traveling state is resumed is provided. [Solution] A control device actuates a clutch actuator so that only a clutch mechanism on a most downstream side in a transmission direction in a selected shift gear is brought to a disengaged state when receiving a power cut-off signal in a state in which a traveling state change member is subjected to a forward operation or a reverse operation, and, actuates the clutch actuator so that only the clutch mechanism on the most downstream side in the transmission direction in the selected presumed shift gear is brought to a disengaged state based on a traveling state, and in addition, actuates a gear shift actuator so that a gear ratio of a continuously variable transmission mechanism that realizes a vehicle speed at that time point in the presumed shift gear is obtained while the power cut-off signal is valid, and actuates the clutch actuator so that the clutch mechanism on the most downstream side in the transmission direction in the presumed shift gear at that time point is brought to an engaged state when a cancel signal for canceling the power cut-off signal is input.

23 Claims, 11 Drawing Sheets

(51) Int. Cl.
*F16H 37/02* (2006.01)
*F16H 61/04* (2006.01)
*F16H 61/40* (2010.01)
*F16H 61/47* (2010.01)

(52) U.S. Cl.
CPC ............... *B60W 2510/0647* (2013.01); *B60W 2710/0655* (2013.01)

(58) Field of Classification Search
CPC ............... F16H 59/44; F16H 2037/044; F16H 2312/09; F16H 61/04; F16H 61/462; F16H 61/47; F16H 61/702; F16H 61/40; F16H 2037/0886; F16H 3/44; B60W 30/19; B60W 30/188; B60W 30/18072; B60W 2510/0647; B60W 2710/0655; B60K 17/10; B60Y 2200/222; B60Y 2200/221
See application file for complete search history.

FIG. 8A

FORWARD-REVERSE SWITCHING OPERATION MEMBER 92 IS IN REVERSE POSITION R

| REVERSE SECOND SPEED STAGE | REVERSE FIRST SPEED STAGE | FORWARD FIRST SPEED STAGE | FORWARD SECOND SPEED STAGE | FORWARD THIRD SPEED STAGE |
|---|---|---|---|---|
| REVERSE DIRECTION VEHICLE SPEED (-Km/H) OR TM SPEED RATIO | REVERSE SIDE FIRST/SECOND SPEED STAGE SWITCHING SPEED | 0    +⅛ | FORWARD SIDE FIRST/SECOND SPEED STAGE SWITCHING SPEED | FORWARD SIDE SECOND/THIRD SPEED STAGE SWITCHING SPEED | FORWARD DIRECTION VEHICLE SPEED (+Km/H) OR TM SPEED RATIO |

FIG. 8B

FORWARD-REVERSE SWITCHING OPERATION MEMBER 92 IS IN NEUTRAL POSITION N

| REVERSE SECOND SPEED STAGE | REVERSE FIRST SPEED STAGE | FORWARD FIRST SPEED STAGE | FORWARD SECOND SPEED STAGE | FORWARD THIRD SPEED STAGE |
|---|---|---|---|---|
| REVERSE DIRECTION VEHICLE SPEED (-Km/H) OR TM SPEED RATIO | REVERSE SIDE FIRST/SECOND SPEED STAGE SWITCHING SPEED | 0 | FORWARD SIDE FIRST/SECOND SPEED STAGE SWITCHING SPEED | FORWARD SIDE SECOND/THIRD SPEED STAGE SWITCHING SPEED | FORWARD DIRECTION VEHICLE SPEED (+Km/H) OR TM SPEED RATIO |

FIG. 8C

FORWARD-REVERSE SWITCHING OPERATION MEMBER 92 IS IN FORWARD POSITION F

| REVERSE SECOND SPEED STAGE | REVERSE FIRST SPEED STAGE | FORWARD FIRST SPEED STAGE | FORWARD SECOND SPEED STAGE | FORWARD THIRD SPEED STAGE |
|---|---|---|---|---|
| REVERSE DIRECTION VEHICLE SPEED (-Km/H) OR TM SPEED RATIO | REVERSE SIDE FIRST/SECOND SPEED STAGE SWITCHING SPEED | -⅛   0 | FORWARD SIDE FIRST/SECOND SPEED STAGE SWITCHING SPEED | FORWARD SIDE SECOND/THIRD SPEED STAGE SWITCHING SPEED | FORWARD DIRECTION VEHICLE SPEED (+Km/H) OR TM SPEED RATIO |

FIG. 11

| VEHICLE TRAVELING DIRECTION | VEHICLE SPEED SETTING SECTION | CORRESPONDING SHIFT GEAR | CLUTCH MECHANISM CONSTITUTING SHIFT GEAR | | | | | | |
|---|---|---|---|---|---|---|---|---|---|
| | | | 60a | 60b | 80a | 80b | 80c | 410F | 410R |
| FORWARD | TRAVELING THIRD GEAR RANGE | THIRD GEAR | × | ○ | × | × | ● | × | × |
| | TRAVELING SECOND GEAR RANGE | SECOND GEAR | × | ○ | × | ○ | × | ● | × |
| | TRAVELING FIRST GEAR RANGE | FIRST GEAR | ○ | × | ○ | × | × | ● | × |
| | NEUTRAL | | × | × | × | × | × | × | × |
| REVERSE | TRAVELING FIRST GEAR RANGE | FIRST GEAR | ○ | × | ○ | × | × | × | ● |
| | TRAVELING SECOND GEAR RANGE | SECOND GEAR | × | ○ | × | ○ | × | × | ● |

○ ENGAGEMENT
● ENGAGEMENT (MOST DOWNSTREAM CLUTCH IN TRANSMISSION DIRECTION)
× DISENGAGEMENT

TRANSMISSION STRUCTURE

CROSS REFERENCE TO RELATED APPLICATIONS

The present invention claims priority under 35 U.S.C. § 119 to Japanese Application, 2023-059816, filed on Apr. 3, 2023, the entire contents of which being incorporated herein by reference.

TECHNICAL FIELD

The present disclosure relates to a structure of a transmission interposed in a transmission path extending from a drive source to traveling wheels.

BACKGROUND ART

The following transmission structure has been suitably used in work vehicles including an agricultural combines and tractors. That is, the transmission structure includes a transmission mechanism having a plurality of shift gear stages, a plurality of clutch mechanisms for selecting a desired one of the shift gear stages, a clutch actuator capable of meshing each of the clutch mechanisms, a hydraulic continuously variable transmission mechanism (Hydro Static Transmission/HST) serving as a continuously variable transmission mechanism that continuously varies a speed of rotation power in the plurality of shift gear stages, an actuator that changes an output of the continuously variable transmission mechanism, and a control device that controls operations of the clutch actuator and the transmission actuator.

For example, the applicant of this application has proposed a transmission structure including the HST, a planetary gear mechanism which has a first element, a second element, and a third element which receives a continuously variable transmission output, a gear shift output shaft which is operatively driven by a planetary output section of the planetary gear mechanism and which outputs rotation power to traveling wheels, an input-side first transmission mechanism and an input-side second transmission mechanism which are capable of operatively transmitting rotation power of the drive source to the first element and the second element, respectively, an input-side first clutch mechanism and an input-side second clutch mechanism which engages or disengages power transmission of the input-side first transmission mechanism and the input-side second transmission mechanism, respectively, an output-side first transmission mechanism and an output-side second transmission mechanism which are capable of operatively transmitting rotation power of the second element and the first element, respectively, to the gear shift output shaft, an output-side first clutch mechanism and an output-side second clutch mechanism which engages or disengages power transmission of the output-side first transmission mechanism and the output-side second transmission mechanism, respectively, a forward-side transmission mechanism and a reverse-side transmission mechanism which operatively transmit rotation power of the gear shift output shaft to the traveling wheels as drive rotation power in a forward direction and a reverse direction, respectively, a forward-side clutch mechanism and a reverse-side clutch mechanism which engage or disengage power transmission of the forward-side transmission mechanism and the reverse-side transmission mechanism, respectively, a vehicle speed setting member which changes a rotation speed of the gear shift output shaft, a forward-reverse switching operation member which changes a rotation direction of the gear shift output shaft, and a control device (refer to Patent Document 1 below).

The control device is configured as follows.

(1) When a vehicle speed is in a traveling first gear range, the input-side and output-side first clutch mechanisms are brought to an engaged state whereas the input-side and output-side second clutch mechanisms are brought to a disengaged state. Accordingly, a first transmission state is realized in which the first element functions as a planetary input section for inputting reference power supplied from the drive source and the second element functions as a planetary output section. Then an output adjusting member of the HST is operated so as to change an HST gear ratio from a first HST gear to a second HST gear in accordance with an acceleration operation performed by the vehicle speed setting member.

(2) When a vehicle speed is in a traveling second gear range, a second transmission state is realized in which the input-side and output-side first clutch mechanisms are brought to a disengaged state and the input-side and output-side second clutch mechanisms are brought to an engaged state so that the first element functions as a planetary output section and the second element functions as a planetary input section. Then the output adjusting member is operated so as to change the HST gear ratio from the second HST gear to the first HST gear in accordance with an acceleration operation performed by the vehicle speed setting member.

Furthermore, the control device selectively realizes a forward drive traveling state in which the forward-side clutch mechanism is brought to an engaged state and the reverse-side clutch mechanism is brought to a disengaged state, a reverse drive traveling state in which the forward-side clutch mechanism is brought to a disengaged state and the reverse-side clutch mechanism is brought to an engaged state, or a neutral state in which both the forward-side clutch mechanism and the reverse-side clutch mechanism are brought to a disengaged state.

Here, according to the general transmission structure, when a braking operation using a braking operation member (pedal), a power cut-off operation, such as a clutch canceling operation using a clutch operation member (pedal), or a neutral operation using a forward-reverse switching operation member (lever) is performed during a drive traveling state in which rotation power is output to the traveling wheels, the control device operates a clutch actuator so that all the clutch mechanisms in the engaged state at that time point are brought to a disengaged state.

In such a general transmission structure, there arises a problem in that a traveling feeling is deteriorated due to a shock or vibration when a driver performs the following operation. That is, the driver blocks power transmission to the traveling wheels by performing the power cut-off operation, such as the braking operation or the clutch canceling operation, or the neutral operation so that a coasting traveling state is entered, and thereafter, resuming to the drive traveling state is performed by canceling the power cut-off operation.

Specifically, when the power cut-off state is entered by the power cut-off operation or the neutral operation, all the clutch mechanisms in the engaged state in the drive traveling state are brought to the disengaged state, and therefore, transmission members, such as an intermediate transmission shaft disposed between a driven member of a most upstream clutch mechanism and a drive member of a most downstream clutch mechanism in a transmission direction, among the clutch mechanisms engaged in the drive traveling state, are not operatively coupled with any of the drive source and the traveling wheels.

In the coasting traveling state, a rotation speed of the intermediate transmission shaft may not be changed even when the HST is operated for gear shift, and therefore, a large relative rotation speed difference is generated between the driven member of the clutch mechanism in which a rotation speed thereof is changed depending on a vehicle weight or a road condition and the drive member of the clutch mechanism continuously driven by the drive source. When the power cut-off operation is canceled and resuming to the drive traveling state is performed, the clutch mechanism is engaged in a state in which there is a rotation speed difference, so that vibration and shock occur and the traveling feeling is deteriorated.

Note that, for the resuming to the drive traveling state after the coasting traveling with all the engaged clutch mechanisms brought to a disengaged state, first, a transmission state between the HST and the intermediate transmission shaft is realized by causing the most upstream clutch mechanism in the transmission direction to be brought to the engaged state, and thereafter, the HST is subjected to gear shift such that the rotation speed of the intermediate transmission shaft matches or becomes close to the rotation speed of the traveling wheels. As a result, when a desired clutch mechanism is brought to an engaged state, a rotation speed difference at a time of engagement of the clutch mechanism may be reduced. However, a considerable control time is required for the resuming to the drive traveling state, and in this respect, the traveling feeling is deteriorated.

Furthermore, there arises a problem, in the general transmission structure described above, in that, when the vehicle is moved forward or backward by a reverser operation which is an operation of the forward-reverse switching operation member to a forward position or a reverse position in the coasting traveling state realized by positioning the forward-reverse switching operation member in the neutral position, a long period of time is required for acceleration and a traveling feeling is deteriorated.

PRIOR ART DOCUMENT

Patent Document

Patent Document 1: US-A 2020124170

SUMMARY OF INVENTION

Technical Problem

The present disclosure is made in view of the general techniques, and an object is to provide a transmission structure which includes transmission mechanisms having a plurality of shift gears, a plurality of clutch mechanisms for selecting a desired one of the shift gears, a clutch actuator capable of performing engagement and disengagement of the clutch mechanisms, a continuously variable transmission mechanism, a gear shift actuator which operates a change in an output of the continuously variable transmission mechanism, and a control device which controls operation of the clutch actuator and the gear shift actuator, and the control device realizes a state in which drive force transmission to the traveling wheels is blocked in accordance with an input of a power block signal or a neutral signal, and resumes the drive force transmission to the traveling wheels in response to an input of a canceling signal for canceling the power cut-off signal or the neutral signal. In the transmission structure, resuming from the coasting traveling state to the drive traveling state is smoothly performed.

Solution to Problem

In order to achieve the above object, a first aspect of the present disclosure is configured as follows.

Specifically, a transmission structure interposed in a transmission path extending from a drive source to traveling wheels includes transmission mechanisms which have a plurality of shift gears and a plurality of clutch mechanisms disposed for the plurality of shift gears, a clutch actuator that performs engagement and disengagement of the plurality of clutch mechanisms, a continuously variable transmission mechanism that continuously varies speeds of rotation power in the plurality of shift gears, a gear shift actuator that performs an operation of changing an output of the continuously variable transmission mechanism, a traveling state change member that is operable by a person, and a control device that actuates, in a drive traveling state in which a vehicle traveling direction recognized based on at least one of a vehicle speed and a transmission (TM) gear ratio of the transmission structure when the traveling state change member is in a forward position or a reverse position matches a forward-reverse operation direction of the traveling state change member, the clutch actuator so that a clutch mechanism which realize a shift gear corresponding to a traveling state at that time point is brought to an engaged state, and in addition, the gear shift actuator so that a drive rotation speed corresponding to an operation state of the traveling state change member in the shift gear is obtained. The control device is configured as follows.

(1) The control device actuates the clutch actuator, when a power cutoff signal is input during the drive traveling, so that only one of the clutch mechanisms on a most downstream side in a transmission direction in the selected shift gear is brought to a disengaged state.

(2) The control device determines a presumed shift gear to be selected in a coasting traveling state caused by power cutoff, actuates the clutch actuator so that only one of the clutch mechanisms on the most downstream side in the transmission direction in the presumed shift gear is brought to a disengaged state and the other clutch mechanisms are brought to an engaged state, and in addition, actuates the gear shift actuator so as to obtain a hydro-static transmission (HST) speed ratio which realizes an output state corresponding to a vehicle speed at that time point in the presumed shift gear.

(3) The control device actuates the clutch actuator, when a drive traveling state is resumed due to an input of a cancel signal for canceling a power cutoff signal in a state in which the traveling state change member is subjected to a forward operation or a reverse operation, so that the clutch mechanism on the most downstream side in the transmission direction in the presumed shift gear at the time point is brought to an engaged state.

According to a mode of the first aspect, the following structure is employed. Specifically, the transmission mechanisms may include a planetary gear mechanism which has a first element, a second element, and a third element which functions as an input section of a continuously variable transmission output, an input-side first transmission mechanism capable of operatively transmitting rotation power of the drive source to the first element, an input-side second transmission mechanism capable of operatively transmitting rotation power of the drive source to the second element, an output-side first transmission mechanism capable of operatively transmitting rotation power of the second element to a gear shift output shaft disposed on a downstream side in a transmission direction relative to the input-side first and second transmission mechanisms, an output-side second transmission mechanism capable of operatively transmitting rotation power of the first element to the gear shift output shaft, and a forward-side transmission mechanism and a reverse-side transmission mechanism which output rotation power of the gear shift output shaft as forward drive force and reverse drive force to the traveling wheels, the clutch mechanisms include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and a forward-side clutch mechanism and a reverse-side clutch mechanism which engage or disengage power transmission of the forward-side transmission mechanism and the reverse-side transmission mechanism, respectively.

In this case, the control device determines the presumed shift gear as follows.

(1) In a case where the coasting traveling state is in a traveling first gear range, a first gear which is realized when the input-side first clutch mechanism, the output-side first clutch mechanism, and the forward-side clutch mechanism or the reverse-side clutch mechanism are brought to the engaged state is determined as the presumed shift gear.

(2) In a case where the coasting traveling state is in a traveling second gear range of a speed higher than the traveling first gear range, a second gear which is realized when the input-side second clutch mechanism, the output-side second clutch mechanism, and the forward-side clutch mechanism or the reverse-side clutch mechanism are brought to the engaged state is determined as the presumed shift gear.

According to the mode of the first aspect, the control device preferably performs operation control as follows when the cancel signal for canceling the power cut-off signal is input and the drive traveling state is resumed.

(1) When the vehicle traveling direction is the same as a forward-reverse operation direction of the traveling state change member or when the vehicle traveling direction is opposite to the forward-reverse operation direction of the traveling state change member but has a value equal to or smaller than a threshold value in the vicinity of zero speed set in advance, the forward-side clutch mechanism or the reverse-side clutch mechanism corresponding to the forward-reverse operation direction of the traveling state change member is determined to be a clutch mechanism on the most downstream side in the transmission direction in the presumed shift gear and is brought to an engaged state.

(2) When the vehicle traveling direction is opposite to the forward-reverse operation direction of the traveling state change member and has a value larger than the threshold value in the vicinity of zero speed, the forward-side clutch mechanism or the reverse-side clutch mechanism which is opposite to the forward-reverse operation direction of the traveling state change member is determined to be a clutch mechanism on the most downstream side in the transmission direction in the presumed shift gear and is brought to an engaged state.

(3) When the forward-side clutch mechanism or the reverse-side clutch mechanism which is opposite to the forward-reverse operation direction of the traveling state change member is determined to be a clutch mechanism on the most downstream side in the transmission direction in the presumed shift gear and is brought to an engaged state, the clutch mechanism is brought to a disengaged state at a predetermined timing and furthermore the forward-side clutch mechanism or the reverse-side clutch mechanism corresponding to the forward-reverse operation direction of the traveling state change member is brought to an engaged state in accordance with zero speed of the traveling state.

The predetermined timing is preferably a time point at which a predetermined period of time set in advance has elapsed from a time point at which the forward-side clutch mechanism or the reverse-side clutch mechanism corresponding to the forward-reverse operation direction of the traveling state change member is brought to an engaged state.

Alternatively, the predetermined timing may be a time point at which the forward-side clutch mechanism or the reverse-side clutch mechanism corresponding to the forward-reverse operation direction of the traveling state change member is brought to an engaged state.

According to the mode of the first aspect, the transmission mechanisms preferably have the following structure.

Specifically, the transmission mechanisms may further include a traveling output shaft operatively coupled with the gear shift output shaft via the forward-side transmission mechanism and the reverse-side transmission mechanism, and an output-side third transmission mechanism which is capable of operatively transmitting rotation power of the first element as forward drive force to the traveling output shaft and which has a gear ratio set such that a rotation speed of the traveling output shaft obtained when rotation power of the first element is operatively transmitted to the traveling output shaft via the output-side third transmission mechanism is higher than a rotation speed of the traveling output shaft obtained when the rotation power of the first element is operatively transmitted to the traveling output shaft via the output-side second transmission mechanism and the forward-side transmission mechanism. The clutch mechanisms may further include an output-side third clutch mechanism which engages or disengages power transmission of the output-side third transmission mechanism.

In this case, the control device determines, in a traveling third gear range of a speed higher than the traveling second gear range recognized based on at least one of the vehicle speed and the TM gear ratio, a forward third gear which is realized when the input-side second clutch mechanism and the output-side third clutch mechanism are brought to an engaged state as a presumed shift gear.

When the cancel signal for canceling the power cut-off signal is input for resuming to the drive traveling state, the control device preferably (1) determines, when the vehicle traveling direction recognized based on at least one of the vehicle speed and the TM gear ratio is the same as a forward-reverse operation direction of the traveling state change member or when the vehicle traveling direction is opposite to the forward-reverse operation direction of the traveling state change member but has a value equal to or smaller than a threshold value in the vicinity of zero speed set in advance, a shift gear which corresponds to the traveling direction corresponding to the forward-reverse operation direction of the traveling state change member and which corresponds to a vehicle speed at that time point as a presumed shift gear, and (2) determines, when the vehicle traveling direction is opposite to the forward-reverse operation direction of the traveling state change member and has a value larger than the threshold value in the vicinity of zero speed, a shift gear which corresponds to a direction opposite to the forward-reverse operation direction of the traveling state change member and which corresponds to a vehicle speed at that time point as the presumed shift gear.

According to the first aspect, the control device preferably determines whether the threshold value in the vicinity of zero speed is exceeded based on a vehicle speed while making a determination of a presumed shift gear to be brought to an engaged state based on a TM gear ratio.

In order to achieve the above object, a second aspect of the present disclosure is configured as follows.

Specifically, a transmission structure interposed in a transmission path extending from a drive source to traveling wheels includes transmission mechanisms which have a plurality of shift gears and a plurality of clutch mechanisms for selecting a desired shift gear from among the plurality of shift gears, and a forward-side clutch mechanism and a reverse-side clutch mechanism which are capable of realizing a forward drive traveling state in which the traveling wheels are driven in a forward direction and a reverse drive traveling state in which the traveling wheels are driven in a reverse direction, respectively, a clutch actuator that performs an engagement operation and a disengagement operation of the plurality of clutch mechanisms, a continuously variable transmission mechanism that continuously varies rotation power in the plurality of shift gears, a gear shift actuator that performs an operation of changing an output of the continuously variable transmission mechanism, a traveling state change member selectively operable to a forward position, a neutral position, or a reverse position for determining a traveling direction of a vehicle, and a control device which operatively controls the clutch actuator and the gear shift actuator. The control device is configured as follows.

(1) The control device actuates, in a drive traveling state in which the vehicle traveling direction matches an operation position of the traveling state change member, the clutch actuator so that a clutch mechanism for a shift gear corresponding to the traveling state at that time point is brought to an engaged state, and in addition, the gear shift actuator to obtain a drive rotation speed corresponding to an operation state of the traveling state change member in the shift gear.

(2) The control device actuates, when the traveling state change member is operated from the forward position or the reverse position to the neutral position, the clutch actuator so that both the forward-side clutch mechanism and the reverse-side clutch mechanism are brought to a disengaged state and a coasting traveling state is realized.

(3) The control device determines a presumed shift gear corresponding to the coasting traveling state, actuates the clutch actuator so that only one of the clutch mechanisms on a most downstream side in a transmission direction corresponding to the presumed shift gear is brought to a disengaged state and the other clutch mechanisms are brought to an engaged state, and in addition, actuates the gear shift actuator so as to obtain a gear ratio of a continuously variable transmission mechanism which realizes a vehicle speed at that time point with the presumed shift gear.

(4) The control device actuates the clutch actuator so that the clutch mechanism on the most downstream side in the transmission direction in the presumed shift gear at the time point is brought to an engaged state when the drive traveling state is resumed from the coasting traveling state to the drive traveling state by an operation of the traveling state change member.

The control device according to a mode of the second aspect is configured as follows.

Specifically, the control device brings, when the presumed shift gear at a time of resuming to the drive traveling state by an operation of the traveling state change member is a shift gear which outputs rotation drive force in a direction different from the traveling direction instructed by the traveling state change member, the clutch mechanism on the most downstream side in the transmission direction, which is brought to the engaged state at the time of the resuming to the traveling state, to a disengaged state after a predetermined period of time has elapsed.

The control device according to another mode of the second aspect is configured as follows.

Specifically, the control device brings, when the presumed shift gear at a time of resuming to the drive traveling state by an operation of the traveling state change member is a shift gear which outputs rotation drive force in a direction different from the traveling direction instructed by the traveling state change member, the clutch mechanism, which is brought to the engaged state at the time of the resuming to the drive traveling state, to a disengaged state at a timing when a clutch mechanism on the most downstream side in the transmission direction in a next shift gear is brought to an engaged state.

The transmission mechanisms according to the second aspect may include a planetary gear mechanism which has a first element, a second element, and a third element which functions as an input section of a continuously variable transmission output, an input-side first transmission mechanism capable of operatively transmitting rotation power of the drive source to the first element with an input-side first gear ratio, an input-side second transmission mechanism capable of operatively transmitting rotation power of the drive source to the second element with an input-side second gear ratio, an output-side first transmission mechanism capable of operatively transmitting rotation power of the second element to a gear shift output shaft disposed on a downstream side in the transmission direction relative to the input-side first and second transmission mechanisms with an output-side first gear ratio, an output-side second transmission mechanism capable of operatively transmitting rotation power of the first element to the gear shift output shaft with an output-side second gear ratio, and a forward-side transmission mechanism and a reverse-side transmission mechanism which output the rotation power of the gear shift output shaft as forward drive force and reverse drive force to the traveling wheels, and the clutch mechanisms may include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and forward-side and reverse-side clutch mechanisms which engage or disengage power transmission of the forward-side and reverse-side transmission mechanisms, respectively.

The transmission mechanisms according to the second aspect may further include a traveling output shaft operatively coupled with the gear shift output shaft via the forward-side transmission mechanism and the reverse-side transmission mechanism, and an output-side third transmission mechanism which is capable of operatively transmitting rotation power of the first element as forward drive force to the traveling output shaft and which has a gear ratio set such that a rotation speed of the traveling output shaft obtained when rotation power of the first element is operatively transmitted to the traveling output shaft via the output-side third transmission mechanism is higher than a rotation speed of the traveling output shaft obtained when the rotation power of the first element is operatively transmitted to the traveling output shaft via the output-side second transmission mechanism and the forward-side transmission mechanism, and the clutch mechanisms further include an output-side third clutch mechanism which engages or disengages power transmission of the output-side third transmission mechanism.

In order to achieve the above object, a third aspect of the present disclosure is configured as follows.

Specifically, a transmission structure interposed in a transmission path extending from a drive source to traveling wheels includes transmission mechanisms which have a plurality of shift gears and which have a plurality of clutch mechanisms for selecting a desired shift gear from among the plurality of shift gears, a clutch actuator that performs engagement and disengagement of the plurality of clutch mechanisms, a continuously variable transmission mechanism that continuously varies rotation power in the plurality of shift gears, a gear shift actuator that performs an operation of changing the continuously variable transmission mechanism, a traveling state change member that is operable by a person, and the control device that actuates the clutch actuator so as to realize a shift gear corresponding to a vehicle speed, and in addition, actuates the gear shift actuator in response to an operation of the traveling state change member. The control device is configured as follows.

(1) The control device actuates, when a power cut-off signal is input in a drive traveling state in a certain shift gear defined based on an operation direction of the traveling state change member and a vehicle speed, the clutch actuator so that only a clutch mechanism on a most downstream side in a transmission direction among the plurality of clutch mechanisms which realize a drive traveling state in the certain shift gear is brought to a disengaged state.

(2) The control device determines, when the power cut-off signal is valid in a state in which the traveling state change member is operated in a forward or reverse direction, a presumed shift gear which corresponds to a traveling direction corresponding to the operation state of the traveling state change member and which corresponds to a vehicle speed at that time point, actuates the clutch actuator so that only the clutch mechanism on the most downstream side in the transmission direction among the plurality of clutch mechanisms which realize the presumed shift gear is brought to a disengaged state and the other clutch mechanisms are brought to the engaged state, and in addition, actuates the gear shift actuator so that an HST gear ratio which realizes a vehicle speed at that time point in the presumed shift gear is obtained.

(3) The control device actuates, when a cancel signal for canceling the power cut-off-signal is input in a state in which the traveling state change member is operated in a forward or reverse direction, the clutch actuator so that the clutch mechanism on the most downstream side in the transmission direction in the presumed shift gear at that time point is brought to an engaged state.

The transmission mechanisms according to a mode of a third aspect may include a planetary gear mechanism which has a first element, a second element, and a third element which functions as an input section of a continuously variable transmission output, an input-side first transmission mechanism capable of operatively transmitting rotation power of the drive source to the first element with an input-side first gear ratio, an input-side second transmission mechanism capable of operatively transmitting rotation power of the drive source to the second element with an input-side second gear ratio, an output-side first transmission mechanism capable of operatively transmitting rotation power of the second element to a gear shift output shaft disposed on a downstream side in the transmission direction relative to the input-side first and second transmission mechanisms with an output-side first gear ratio, an output-side second transmission mechanism capable of operatively transmitting rotation power of the first element to the gear shift output shaft with an output-side second gear ratio, and a forward-side transmission mechanism and a reverse-side transmission mechanism which output the rotation power of the gear shift output shaft as forward drive force and reverse drive force to the traveling wheels, and the clutch mechanisms may include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and forward-side and reverse-side clutch mechanisms which engage or disengage power transmission of the forward-side and reverse-side transmission mechanisms, respectively.

The control device according to the mode of the third aspect is configured as follows.

(1) The control device actuates the clutch actuator so that switching between engagement and disengagement of the forward-side and reverse-side clutch mechanisms is performed in response to an operation of the traveling state change member.

(2) The control device actuates, when a vehicle speed is in a traveling first gear range, the clutch actuator such that a first transmission state in which the input-side first and second clutch mechanisms are brought to an engaged state and a disengaged state, respectively, so that the first element functions as a reference power input section which inputs reference rotation power from the drive source and the second element functions as a composite power output section which outputs composite rotation power to the gear shift output shaft is realized, and furthermore, the output-side first and second clutch mechanisms are brought to an engaged state and a disengaged state, respectively, so that rotation power of the second element is operatively transmitted to the gear shift output shaft.

(3) The control device actuates, when the vehicle speed is in a traveling second gear range of a speed higher than the traveling first gear range, the clutch actuator such that a second transmission state in which the input-side first and second clutch mechanisms are brought to a disengaged state and an engaged state, respectively, so that the second element functions as the reference power input section and the first element functions as the composite power output section is realized, and furthermore, the output-side first and second clutch mechanisms are brought to a disengaged state and an engaged state, respectively, so that rotation power of the first element is operatively transmitted to the gear shift output shaft.

The transmission mechanisms according to the mode of the third aspect may preferably further include a traveling output shaft operatively coupled with the gear shift output shaft via the forward-side transmission mechanism and the reverse-side transmission mechanism, and an output-side third transmission mechanism which is capable of operatively transmitting rotation power of the first element as forward drive force to the traveling output shaft and which has a gear ratio set such that a rotation speed of the traveling output shaft obtained when rotation power of the first element is operatively transmitted to the traveling output shaft via the output-side third transmission mechanism is higher than a rotation speed of the traveling output shaft obtained when the rotation power of the first element is operatively transmitted to the traveling output shaft via the output-side second transmission mechanism and the forward-side transmission mechanism, and the clutch mechanisms further include an output-side third clutch mechanism which engages or disengages power transmission of the output-side third transmission mechanism.

In this case, the control device may activate the clutch actuator so that, in a state in which the second transmission state is realized, the output-side first and second clutch mechanisms are brought to a disengaged state, the output-side third clutch mechanism is brought to an engaged state, and the forward-side clutch mechanism is brought to a disengaged state.

According to various structures of the first aspect, the power cut-off signal is a braking operation signal supplied from a braking operation member or a clutch cancel operation signal supplied from a clutch operation member.

In order to achieve the above object, a fourth aspect of the present disclosure is configured as follows.

Specifically, a transmission structure interposed in a transmission path extending from a drive source to traveling wheels includes transmission mechanisms that include a forward-side clutch mechanism and a reverse-side clutch mechanism which are capable of realizing a forward drive traveling state in which the traveling wheels are driven in a forward direction and a reverse drive traveling state in which the traveling wheels are driven in a reverse direction, respectively, and a plurality of clutch mechanisms which have a plurality of shift gears and which are used to select a desired shift gear from among the plurality of shift gears, a clutch actuator that performs an engagement operation and a disengagement operation of the plurality of clutch mechanisms, a continuously variable transmission mechanism that continuously varies rotation power in the plurality of shift gears, a gear shift actuator that performs an operation of changing the continuously variable transmission mechanism, a traveling state change member that is operable by a person, and a control device that actuates the clutch actuator so as to realize a shift gear which corresponds to a traveling direction corresponding to a forward-reverse operation of the traveling state change member and which corresponds to a vehicle speed, and in addition, actuates the shift gear actuator in response to a gear shift operation of the traveling state change member. The control device is configured as follows.

(1) The control device actuates, when receiving a neutral signal based on a neutral operation shifted from a forward operation or a reverse operation of the traveling state change member, the clutch actuator so that both the forward-side clutch mechanism and the reverse-side clutch mechanism are brought to a disengaged state.

(2) The control device determines, while the neutral signal is valid, a presumed shift gear corresponding to a vehicle speed at that time point, actuates the clutch actuator so that the disengaged state of the forward-side clutch mechanism and the reverse-side clutch mechanism is maintained and the plurality of clutch mechanisms, other than the forward-side clutch mechanism and the reverse-side clutch mechanism, which realize the presumed shift gear are brought to an engaged state, and in addition, actuates the gear shift actuator so as to obtain an HST gear ratio which realizes the vehicle speed at that time point in the presumed shift gear.

(3) The control device actuates, when the traveling state change member is operated in the forward direction or the reverse direction, the clutch actuator so that the forward-side clutch mechanism or the reverse-side clutch mechanism corresponding to the operation direction of the traveling state change member is brought to an engaged state in accordance with the operation direction of the traveling state change member.

The transmission mechanisms according to a mode of a fourth aspect may include a planetary gear mechanism which has a first element, a second element, and a third element which functions as an input section of a continuously variable transmission output, an input-side first transmission mechanism capable of operatively transmitting rotation power of the drive source to the first element with an input-side first gear ratio, an input-side second transmission mechanism capable of operatively transmitting rotation power of the drive source to the second element with an input-side second gear ratio, an output-side first transmission mechanism capable of operatively transmitting rotation power of the second element to a gear shift output shaft disposed on the downstream side in the transmission direction relative to the input-side first and second transmission mechanisms with an output-side first gear ratio, and an output-side second transmission mechanism capable of operatively transmitting rotation power of the first element to the gear shift output shaft with an output-side second gear ratio, the forward-side and reverse-side clutch mechanisms output the rotation power of the gear shift output shaft as forward drive power and reverse drive power, respectively, to the traveling wheels, the clutch mechanisms include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and a forward-side clutch mechanism and a reverse-side clutch mechanism which engage or disengage power transmission of the forward-side transmission mechanism and the reverse-side transmission mechanism, respectively.

The control device according to the mode of the fourth aspect is configured as follows.

(1) The control device actuates the clutch actuator so that switching between engagement and disengagement of the forward-side and reverse-side clutch mechanisms is performed in response to a forward-reverse operation of the traveling state change member.

(2) The control device actuates, when a vehicle speed is in a traveling first gear range, the clutch actuator such that a first transmission state in which the input-side first and second clutch mechanisms are brought to an engaged state and a disengaged state, respectively, so that the first element functions as a reference power input section which inputs reference rotation power from the drive source and the second element functions as a composite power output section which outputs composite rotation power to the gear shift output shaft is realized, and furthermore, the output-side first and second clutch mechanisms are brought to an engaged state and a disengaged state, respectively, so that rotation power of the second element is operatively transmitted to the gear shift output shaft.

(3) The control device actuates, when the vehicle speed is in a traveling second gear range of a speed higher than the traveling first gear range, the clutch actuator such that a second transmission state in which the input-side first and second clutch mechanisms are brought to a disengaged state and an engaged state, respectively, so that the second element functions as the reference power input section and the first element functions as the composite power output section is realized, and furthermore, the output-side first and second clutch mechanisms are brought to a disengaged state and an engaged state, respectively, so that rotation power of the first element is operatively transmitted to the gear shift output shaft.

According to the various structures of the present disclosure, the traveling state change member preferably includes a vehicle speed setting member and a forward-reverse switching operation member.

In this case, the control device actuates the gear shift actuator in response to an operation of the vehicle speed setting member, and actuates the clutch actuator so that switching between engagement and disengagement of the forward-side and reverse-side clutch mechanisms is performed in response to an operation of the forward-reverse switching operation member.

Advantageous Effects of Invention

According to the transmission structure of the present disclosure, during traveling drive in a forward or reverse direction, drive force transmission to the traveling wheels is blocked in response to an input of a power cut-off signal, such as a braking operation of the braking operation member or a clutch canceling operation of the clutch operation member, and thereafter, the drive force transmission to the traveling wheels is resumed in response to the cancel signal for canceling the power cut-off signal or the neutral signal.

The traveling feeling at this time may be improved.

Furthermore, according to the transmission structure of the present disclosure, smooth acceleration can be realized when the vehicle is started by a so-called reverser operation in which the forward and reverse positions are repeatedly operated.

BRIEF DESCRIPTION OF DRAWINGS

FIG. 8A to FIG. 8C are diagrams illustrating the relationships between a traveling state recognized based on a vehicle speed and/or a TM gear ratio and a presumed shift gear, and FIG. 8A to FIG. 8C correspond to the relationships between a traveling state and a presumed shift gear with the forward-reverse switching operation member being in a reverse position R, a neutral position N, and a forward position F, respectively.

FIG. 11 is a matrix diagram illustrating control of the clutch mechanisms corresponding to setting sections of a vehicle speed and shift gears.

DESCRIPTION OF EMBODIMENTS

Hereinafter, an embodiment of a transmission structure according to the present disclosure will be described with reference to the accompanying drawings.

Figure 1:
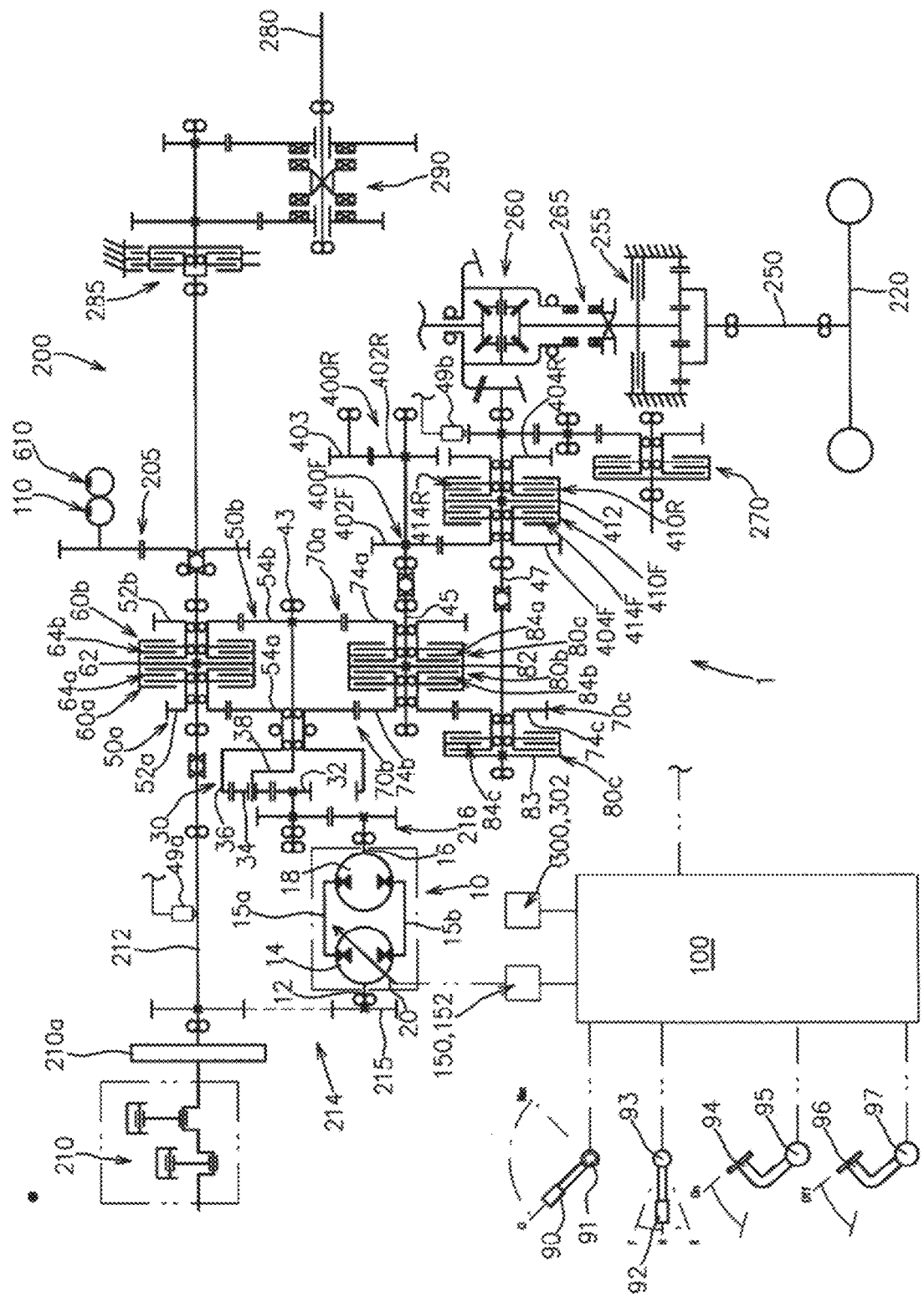
FIG. 1 is a diagram schematically illustrating power transmission in a work vehicle to which a transmission structure according to an embodiment of the present disclosure is applied.

FIG. 1 is a diagram schematically illustrating power transmission in a work vehicle 200 to which a transmission structure 1 according to an embodiment is applied.

Figure 2:
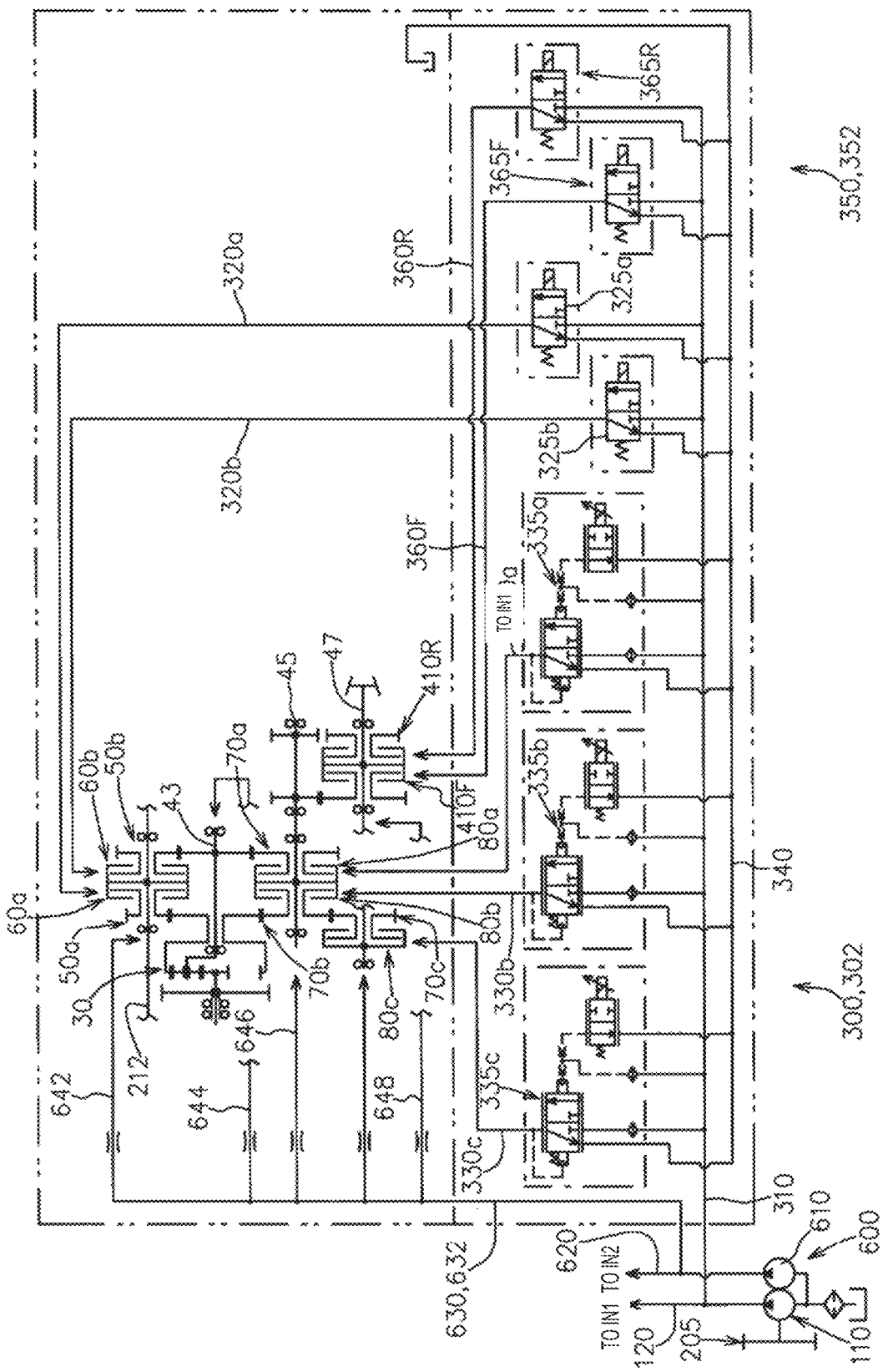
FIG. 2 is a diagram illustrating a hydraulic circuit which is a part of the transmission structure according to the embodiment.

Furthermore, in FIG. 2, a hydraulic circuit diagram of a part of the transmission structure 1 is illustrated.

As illustrated in FIG. 1, the work vehicle 200 includes a drive source 210 which performs driving of a work machine and traveling, traveling wheels 220, and the transmission structure 1 interposed in a traveling-system power transmission path extending from the drive source 210 to the traveling wheels 220. Note that the drive source 210 is an internal combustion engine, and a reference numeral 210a in FIG. 1 and FIG. 2 indicates a flywheel. Note that the drive source may be an electric motor.

As illustrated in FIG. 1, the transmission structure 1 includes the hydro static transmission (HST) 10 which is an example of a continuously variable transmission 10, a planetary gear mechanism 30 that operates in cooperation with the HST 10 so as to form a hydro-static/mechanical continuously variable transmission structure (HMT), a gear shift output shaft 45, a traveling state change member including a vehicle speed setting member 90, such as a gear shift lever, and the control device 100.

Figure 3:
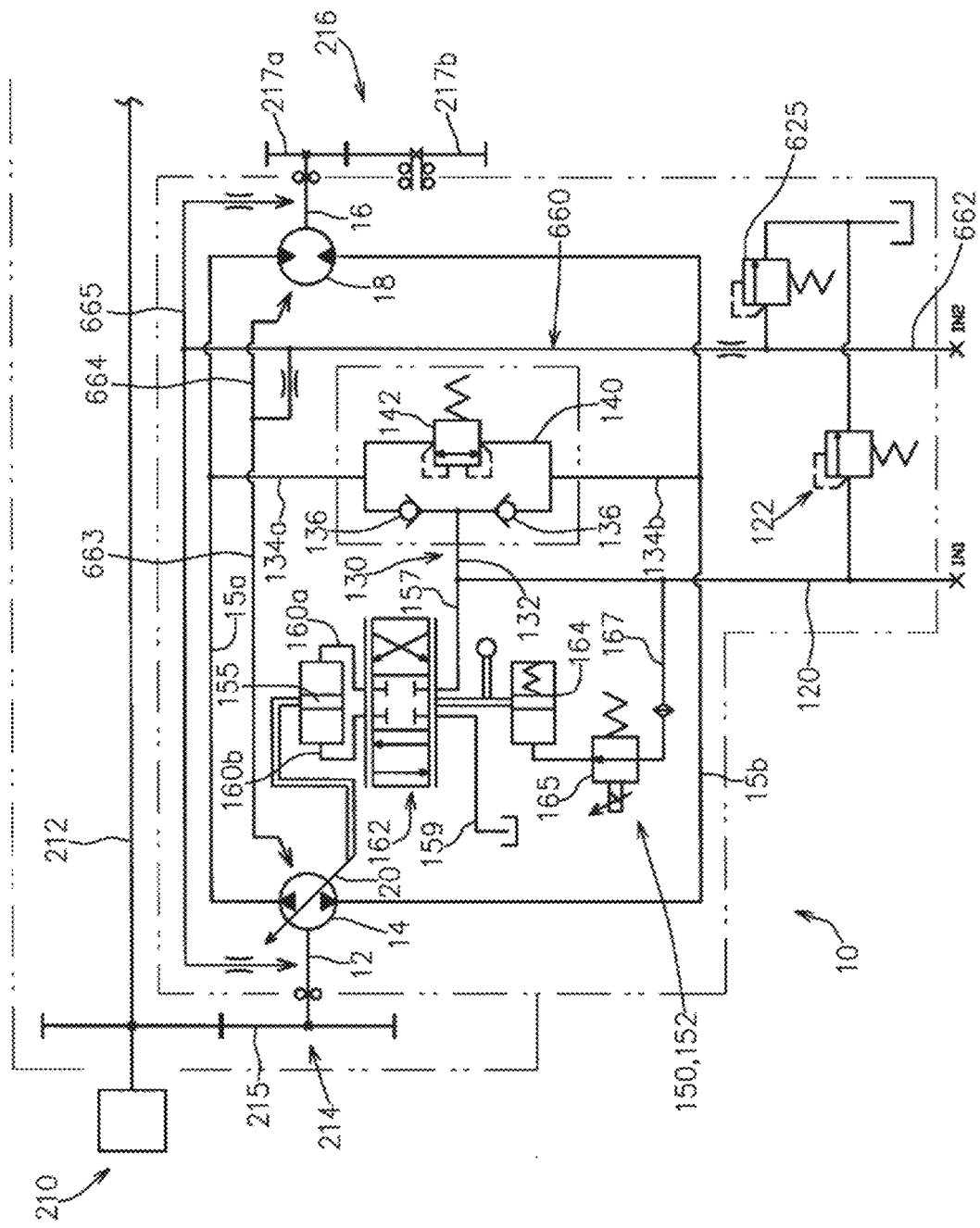
FIG. 3 is a diagram illustrating a hydraulic circuit of an HST, which is a part of the transmission structure according to the embodiment.

In FIG. 3, a hydraulic circuit diagram of the HST 10 is illustrated.

Note that IN1 and IN2 in FIG. 2 are fluidly connected to IN1 and IN2 in FIG. 3, respectively.

As illustrated in FIG. 1 and FIG. 3, the HST 10 includes a pump shaft 12 that is operatively driven in a rotary manner by the drive source 210, an HST pump 14 that is supported by the pump shaft 12 in a manner not capable of relative rotation, an HST motor 18 that is fluidly connected to the HST pump 14 via a pair of first and second HST lines 15a and 15b so as to be hydraulically driven in a rotary manner by the HST pump 14, a motor shaft 16 that supports the HST motor 18 in a manner not capable of relative rotation, and an output adjusting member 20 that changes an inner volume of at least one of the HST pump 14 and the HST motor 18.

The HST 10 is designed so as to continuously vary an HST gear ratio of a power supplied to the pump shaft 12 to a rotation speed, which is output from the motor shaft 16 in accordance with an operation position of the output adjusting member 20.

Specifically, when a rotation speed of a rotation power operationally input from the drive source 210 to the pump shaft 12 is determined as a reference input speed, the HST 10 performs continuously variable transmission on the reference input speed to obtain at least a rotation power in a range from the first HST gear to the second HST gear in accordance with an operation position of the output adjusting member 20, and outputs the result from the motor shaft 16.

Note that, in this embodiment, as illustrated in FIG. 1 and FIG. 3, the pump shaft 12 is coupled via an HST input gear train 214 to a main drive shaft 212, which is operatively coupled to the drive source 210.

In this embodiment, the HST 10 is capable of switching a rotational direction of the continuously variable transmission output between forward and reverse directions.

Specifically, assuming that the rotation direction of the reference input speed corresponds to the forward direction, the HST 10 causes the motor shaft 16 to output a rotation power of the first HST gear in only one of the forward and reverse directions (reverse direction, for example) when the output adjusting member 20 is operated to the first operation position from the neutral position, whereas the HST 10 causes the motor shaft 16 to output the rotation power at the second HST gear in which the rotation direction is the other one of the forward and reverse directions (forward direction, for example) when the output adjusting member 20 is operated to the second operation position from the neutral position.

In this case, when the output adjusting member 20 is operated to the neutral position located between the first and second operation positions, the HST gear ratio becomes a neutral speed (zero speed).

In this embodiment, as the output adjusting member 20 commonly known as an axial piston pump, the HST 10 has a movable swash plate that changes an inner volume of the HST pump 14 by being swung about a swing shaft and that can swing to one side and the other side about the swing shaft with a neutral position placed therebetween having an amount of discharge from the HST pump 14 of zero.

When the movable swash plate is in the neutral position, discharge of pressurized oil from the HST pump 14 is stopped, and thus the HST 10 is brought to a neutral state in which an output of the HST motor 18 is zero.

Furthermore, when the movable swash plate is swung from the neutral position to the forward rotation side about the swing shaft, the pressurized oil is supplied from the HST pump 14 to one of the pair of HST lines 15 (e.g., first HST line 15a), and thus the one of the lines, i.e., the first HST line 15a, is brought to a high pressure side and the other one of the lines, i.e., the second HST line 15b, is brought to a low pressure side. Accordingly, when the HST motor 18 is driven in a rotary manner to the forward rotation side and the movable swash plate reaches a swing end in the forward rotation side, the HST 10 is brought to the first HST gear having a maximum forward rotation output.

Conversely, when the movable swash plate is swung from the neutral position to the reverse side that is the other side about the swing shaft, the pressurized oil is supplied from the HST pump 14 to the other one of the pair of HST lines 15 (e.g., second HST line 15b), and thus the other one of the lines, i.e., the second HST line 15b, is brought to a high pressure side, and the one of the lines, i.e., the first HST line 15a, is brought to a low pressure side. Accordingly, when the HST motor 18 is driven in a rotary manner to the reverse rotation side and the movable swash plate reaches a swing end in the reverse rotation side, the HST 10 is brought to the second HST gear having a maximum reverse output rotation.

Note that, in the HST 10, the inner volume of the HST motor 18 is fixed by the fixed swash plate.

As illustrated in FIG. 3, the HST 10 includes a charge line 130 that supplies the pressurized oil to the pair of first and second HST lines 15a and 15b.

Specifically, as illustrated in FIG. 2, the transmission structure 1 includes the first hydraulic pump 110, which is operatively driven by the drive source 210, and the hydraulic oil line 120, to which the oil discharged from the first hydraulic pump 110 is supplied.

In this embodiment, the first hydraulic pump 110 is operatively coupled to the main drive shaft 212 via the pump driving gear train 205 (refer to FIG. 1).

Hydraulic pressure of the hydraulic oil line 120 is set by a relief valve 122 (refer to FIG. 3).

As illustrated in FIG. 3, the charge line 130 includes a common line 132 having a base end side fluidly connected to the hydraulic oil line 120, a first branch section 134a having a base end side fluidly connected to the common line 132 and a tip side fluidly connected to the first HST line 15a, and a second branch section 134b having a base end side fluidly connected to the common line 132 and a tip side fluidly connected to the second HST line 15b.

In the first and second branch sections 134a and 134b, check valves 136 that allow the pressurized oil to flow from the common line 132 to the corresponding HST lines 15a and 15b and prevent the pressurized oil from flowing in the reverse direction are interposed.

Note that, as illustrated in FIG. 3, the HST 10 further includes a communication line 140, which allows communication between the pair of first and second HST lines 15a and 15b, and a bidirectional relief valve 142, which is interposed in the communication line 140.

In a case where one of the pair of HST lines 15a and 15b has an abnormally high pressure, the communication line 140 and the bidirectional relief valve 142 cause the pressurized oil in the one of the HST lines to flow into the other one of the HST lines.

As illustrated in FIG. 1, the output adjusting member 20 is operatively controlled by the control device 100 in accordance with operations performed on the vehicle speed setting member 90.

Specifically, the transmission structure 1 according to this embodiment includes the gear shift actuator 150 that operates the output adjusting member 20, and the control device 100 actuates the output adjusting member 20 through the gear shift actuator 150 in accordance with an operation of the vehicle speed setting member 90.

The gear shift actuator 150 may employ various configurations, such as an electric motor and a hydraulic mechanism, as long as the control device 100 may control operations of continuously variable sliding and continuously variable rotation.

As illustrated in FIG. 3, the transmission structure 1 according to this embodiment includes a hydraulic servo mechanism 152 as the gear shift actuator 150.

The hydraulic servo mechanism 152 includes a servo piston 155 that is capable of reciprocating in an axial direction with first and second oil chambers respectively defined on one side and the other side in the axial direction, a servo pressurized oil line 157 having a base end side fluidly connected to the hydraulic oil line 120, a drain line 159, first and second servo supply-drain lines 160a and 160b respectively fluidly connected to the first and second oil chambers, a servo switching valve 162 that switches connecting states of the servo pressurized oil line 157, the drain line 159, the first servo supply-drain line 160a, and the second servo supply-drain line 160b, and an operation piston 164 operatively coupled to the servo switching valve 162.

The servo piston 155 is operatively coupled to the movable swash plate so as to cause the movable swash plate, which functions as the output adjusting member 20, to swing about the swing shaft line in accordance with its movement in the axial direction.

The servo switching valve 162 is designed so as to be selectively set to a closing position where the first and second servo supply-drain lines 160a and 160b are closed, a first operation position where the first servo supply-drain line 160a is fluidly connected to the servo pressurized oil line 157 and the second servo supply-drain line 160b is fluidly connected to the drain line 159, or a second operation position where the first servo supply-drain line 160a is fluidly connected to the drain line 159 and the second servo supply-drain line 160b is fluidly connected to the servo pressurized oil line 157.

The operation piston 164 is configured so as to be set to a first operating position, a holding position, and a second operating position that position the servo switching valve 162 in the first operation position, the closing position, and the second operation position, respectively.

In this embodiment, the operation piston 164 is capable of reciprocating in the axial direction with an oil chamber and a spring chamber respectively defined on one side and the other side in the axial direction, and is pressed in a direction to contract the oil chamber by a biasing spring disposed in the spring chamber.

The hydraulic servo mechanism 152 further includes a servo operation line 167 having a base end side fluidly connected to the hydraulic oil line 120 and a tip end side fluidly connected to the oil chamber, and an output adjusting valve 165 capable of adjusting an amount of pressurized oil in the servo operation line 167.

Operation of the output adjusting valve 165 is controlled by the control device 100.

Specifically, the control device 100 operates the output adjusting valve 165 such that the output adjusting member 20 is positioned in an operation position corresponding to an operating position of the vehicle speed setting member 90.

Note that the operating position of the vehicle speed setting member 90 is detected by a vehicle speed setting sensor 91, such as a potentiometer, for example.

As illustrated in FIG. 1, the planetary gear mechanism 30 includes a sun gear 32, a planetary gear 34 that meshes with the sun gear 32, an internal gear 36 that meshes with the planetary gear 34, and a carrier 38 that supports the planetary gear 34 in a rotatable manner about an axial line and rotates about an axial line of the sun gear 32 in conjunction with revolution of the planetary gear 34 around the sun gear 32. In this embodiment, the sun gear 32, the carrier 38, and the internal gear 36 correspond to three planetary elements.

A third element, which is one of the three planetary elements, is operatively coupled to the motor shaft 16, and the third element functions as a variable power input section that inputs a continuously variable transmission output. As illustrated in FIG. 1, the sun gear 32 is the third element in this embodiment.

Note that, in this embodiment, the sun gear 32 is operatively coupled to the motor shaft 16 via a continuously variable transmission output gear train 216.

The transmission structure 1 according to this embodiment has a first transmission state in which the first element in the three planetary elements functions as a reference power input section that inputs a reference rotational power supplied from the drive source 210 and the second element functions as a composite power output section that outputs a composite rotational power, and a second transmission state in which the first element functions as the composite power output section and the second element functions as the reference power input section. The transmission structure 1 performs switching between the first and second transmission states.

Specifically, as illustrated in FIG. 1 and FIG. 2, the transmission structure 1 further includes an input-side first transmission mechanism 50a and an input-side second transmission mechanism 50b that are capable of operatively transmitting rotational power of the drive source 210 to the first and second elements, respectively, an input-side clutch mechanism pair including an input-side first clutch mechanism 60a and an input-side second clutch mechanism 60b that engage and disengage power transmission of the input-side first transmission mechanism 50a and the input-side second transmission mechanism 50b, respectively, an output-side first transmission mechanism 70a and an output-side second transmission mechanism 70b that are capable of operatively transmitting rotational power of the second element and the first element, respectively, to the gear shift output shaft 45, and an output-side clutch mechanism pair including an output-side first clutch mechanism 80a and an output-side second clutch mechanism 80b that engage and disengage the power transmission of the output-side first transmission mechanism 70a and the output-side second transmission mechanism 70b, respectively.

In this embodiment, the internal gear 36 and the carrier 38 function as the first and second elements, respectively.

The input-side first transmission mechanism 50a is capable of transmitting rotational power of the drive source 210 to the internal gear 36 serving as the first element in an input-side first gear ratio.

Specifically, as illustrated in FIG. 1, the input-side first transmission mechanism 50a includes an input-side first drive gear 52a coupled to the main drive shaft 212 in a manner capable of relative rotation, and an input-side first driven gear 54a that is meshed with the input-side first drive gear 52a and is operatively coupled to the first element.

As illustrated in FIG. 1, the transmission structure 1 according to this embodiment includes a gear shift middle shaft 43 disposed coaxially with the planetary gear mechanism 30 and coupled to the second element in a manner not capable of relative rotation about its axis line, and the input-side first driven gear 54a is operatively coupled to the input-side first drive gear 52a and the first element (the internal gear 36 in this embodiment) in a state of being supported by the gear shift middle shaft 43 in a manner capable of relative rotation.

The input-side second transmission mechanism 50b is capable of transmitting rotational power of the drive source 210 to the second element (the carrier 38 in this embodiment) in an input-side second gear ratio.

Specifically, as illustrated in FIG. 1, the input-side second transmission mechanism 50b includes an input-side second drive gear 52b supported by the main drive shaft 212 in a manner capable of relative rotation, and an input-side second driven gear 54b that is meshed with the input-side second drive gear 52b and is operatively coupled to the second element.

In this embodiment, the input-side second driven gear 54b is meshed with the input-side second drive gear 52b in a state of being supported in a manner not capable of relative rotation on the gear shift middle shaft 43 which is coupled to the second element in a manner not capable of relative rotation.

In this embodiment, the input-side first and second clutch mechanisms 60a and 60b are hydraulic multiplate clutch mechanisms.

The input-side first and second clutch mechanisms 60a and 60b are supported by the main drive shaft 212 so as to individually engage and disengage the input-side first and second drive gears 52a and 52b with and from the main drive shaft 212.

Specifically, the input-side first clutch mechanism 60a includes an input-side clutch housing 62 supported by the main drive shaft 212 in a manner not capable of relative rotation, an input-side first friction plate group 64a that includes a first drive-side friction plate supported by the input-side clutch housing 62 in a manner not capable of relative rotation and a first driven-side friction plate supported by the input-side first drive gear 52a in a manner not capable of relative rotation so as to be superposed on the first drive-side friction plate, and an input-side first piston (not illustrated) that engages the input-side first friction plate group 64a.

The input-side second clutch mechanism 60b includes the input-side clutch housing 62, an input-side second friction plate group 64b that includes a second drive-side friction plate supported by the input-side clutch housing 62 in a manner not capable relative rotation and a second driven-side friction plate supported by the input-side second drive gear 52b so as to be superposed on the second drive-side friction plate in a manner not capable of relative rotation, and an input-side second piston (not illustrated) that engages the input-side second friction plate group 64b.

The output-side first transmission mechanism 70a is capable of transmitting rotational power of the second element to the gear shift output shaft 45.

According to this embodiment, the output-side first transmission mechanism 70a is capable of operatively transmitting rotational power of the second element to the gear shift output shaft 45 in the output-side first gear ratio by means of the input-side second driven gear 54b in the input-side second transmission mechanism 50b.

Specifically, as illustrated in FIG. 1, the output-side first transmission mechanism 70a includes the input-side second driven gear 54b and an output-side first driven gear 74a which is operatively coupled to the input-side second driven gear 54b in a state of being supported by the gear shift output shaft 45 in a manner capable of relative rotation.

The output-side second transmission mechanism 70b is capable of transmitting rotational power of the first element to the gear shift output shaft 45.

According to this embodiment, the output-side second transmission mechanism 70b is capable of operatively transmitting rotational power of the first element to the gear shift output shaft 45 in the output-side second gear ratio by means of the input-side first driven gear 54a in the input-side first transmission mechanism 50a.

Specifically, as illustrated in FIG. 1, the output-side second transmission mechanism 70b includes the input-side first driven gear 54a and an output-side second driven gear 74b which is operatively coupled to the input-side first driven gear 54a in a state of being supported by the gear shift output shaft 45 in a manner capable of relative rotation.

The output-side first and second clutch mechanisms 80a and 80b are hydraulic multiplate clutch mechanisms.

In this embodiment, the output-side first and second clutch mechanisms 80a and 80b are supported by the gear shift output shaft 45 so as to engage and disengage the output-side first and second driven gears 74a and 74b with and from the gear shift output shaft 45, respectively.

Specifically, the output-side first clutch mechanism 80a includes an output-side clutch housing 82 supported by the gear shift output shaft 45 in a manner not capable of relative rotation, an output-side first friction plate group 84a that includes a first drive-side friction plate supported by the output-side first driven gear 74a in a manner not capable relative rotation and a first driven-side friction plate supported by the output-side clutch housing 82 so as to be superposed on the first drive-side friction plate in a manner not capable of relative rotation, and an output-side first piston (not illustrated) that frictionally engages the output-side first friction plate group.

The output-side second clutch mechanism 80b includes the output-side clutch housing 82, an output-side second friction plate group 84b that includes a second drive-side friction plate supported by the output-side second driven gear 74b in a manner not capable relative rotation and a second driven-side friction plate supported by the output-side clutch housing 82 so as to be superposed on the second drive-side friction plate in a manner not capable of relative rotation, and an output-side second piston (not illustrated) that frictionally engages the output-side second friction plate group.

The transmission structure 1 further includes the clutch actuator 300 that switches the engagement and disengagement of the input-side first clutch mechanism 60a, the input-side second clutch mechanism 60b, the output-side first clutch mechanism 80a, and the output-side second clutch mechanism 80b.

The clutch actuator 300 may employ various configurations, such as an electric motor and a hydraulic mechanism, as long as the input-side first and second pistons and the output-side first and second pistons are engaged and disengaged by pressing the friction plate in accordance with an instruction issued by the control device.

As illustrated in FIG. 2, the transmission structure 1 according to this embodiment includes a transmission state switching hydraulic mechanism 302 as the clutch actuator 300.

The transmission state switching hydraulic mechanism 302 uses an oil source (the first hydraulic pump 110) that is used in common by the charge line 130 of the HST 10 and the hydraulic servo mechanism 152.

Specifically, the transmission state switching hydraulic mechanism 302 is disposed by connecting input ports of an input-side first solenoid valve 325a, an input-side second solenoid valve 325b, an output-side first solenoid valve 335a, and an output-side second solenoid valve 335b in parallel to the clutch line 310 fluidly connected to the hydraulic oil line 120. Furthermore, the input-side first clutch mechanism 60a, the input-side second clutch mechanism 60b, the output-side first clutch mechanism 80a, and the output-side second clutch mechanism 80b are fluidly connected to the input-side first supply-drain line 320a, the input-side second supply-drain line 320b, the output-side first supply-drain line 330a, and the output-side second supply-drain line 330b, respectively. The input-side first solenoid valve 325a is interposed between the clutch line 310 and the drain line 340 on one side and the input-side first supply-drain line 320a on the other side, the input-side second solenoid valve 325b is interposed between the clutch line 310 and the drain line 340 on one side and the input-side second supply-drain line 320b on the other side, the output-side first solenoid valve 335a is interposed between the clutch line 310 and the drain line 340 on one side and the output-side first supply-drain line 330a on the other side, and the output-side second solenoid valve 335b is interposed between the clutch line 310 and drain line 340 on one side and the output-side second supply-drain line 330b on the other side. The fluid connection is performed with the lines corresponding to outlet ports of the solenoid valves.

The input-side first solenoid valve 325a, the input-side second solenoid valve 325b, the output-side first solenoid valve 335a, and the output-side second solenoid valve 335b are operatively controlled by the control device 100, and can be set to a supply position which fluidly connects the corresponding supply-drain line 320a, 320b, 330a, or 330b to the clutch line 310, or a drain position that fluidly connects the corresponding supply-drain line 320a, 320b, 330a, or 330b to the drain line 340.

As illustrated in FIG. 2, in this embodiment, the input-side first solenoid valve 325a and the input-side second solenoid valve 325b are solenoid switching valves that instantly increase/decrease the hydraulic pressures of the input-side first supply-drain line 320a and the input-side second supply-drain line 320b, respectively, and by this, the friction plate of the input-side first clutch mechanism 60a and the friction plate of the input-side second clutch mechanism 60b may be engaged in a short period of time while the friction plates are individually slipped.

On the other hand, the output-side first solenoid valve 335a and the output-side second solenoid valve 335b are solenoid proportional valves capable of adjusting the increasing/decreasing rates of the hydraulic pressures of the output-side first supply-drain line 330a and the output-side second supply-drain line 330b, respectively, and by this, the friction plate of the output-side first clutch mechanism 80a and the friction plate of the output-side second clutch mechanism 80b may be engaged while the friction plates are individually slipped.

As illustrated in FIG. 1, etc., the transmission structure 1 according to this embodiment further includes a traveling output shaft 47 that outputs a drive rotational power toward the traveling wheel 220, and a forward-side transmission mechanism 400F and a reverse-side transmission mechanism 400R that operatively transmit the rotational power of the gear shift output shaft 45 to the traveling output shaft 47 as drive rotational power in the forward direction and the reverse direction, respectively. In this embodiment, the forward-side transmission mechanism 400F and the reverse-side transmission mechanism 400R include a friction plate type forward-side clutch mechanism 410F and a friction plate type reverse-side clutch mechanism 410R that engage or disengage the power transmission. The clutch actuator 300 includes a forward-reverse switching actuator 350 that switches engagement and disengagement of the forward-side clutch mechanism and the reverse-side clutch mechanism 80b.

As illustrated in FIG. 1, the forward-side transmission mechanism 400F has a forward-side gear train including a forward-side drive gear 402F supported by the gear shift output shaft 45 and a forward-side driven gear 404F meshed with the forward-side drive gear 402F in a state being supported by the gear shift output shaft 45.

In this embodiment, the forward-side drive gear 402F is supported by the gear shift output shaft 45 in a manner not capable of relative rotation, and the forward-side driven gear 404F is supported by the traveling output shaft 47 in a manner capable of relative rotation.

The reverse-side transmission mechanism 400R has a reverse-side gear train including a reverse-side drive gear 402R supported by the gear shift output shaft 45 and a reverse-side driven gear 404R meshed with the reverse-side drive gear 402R through an idle gear 403 (refer to FIG. 1) in a state being supported by the traveling transmission shaft 47.

In this embodiment, the reverse-side drive gear 402R is supported by the gear shift output shaft 45 in a manner not capable of relative rotation, and the reverse-side driven gear 404R is supported by the traveling output shaft 47 in a manner capable of relative rotation.

In this embodiment, the forward-side clutch mechanism 410F and the reverse-side clutch mechanism 410R are supported by the traveling output shaft 47 so as to engage and disengage the forward-side driven gear 404F and the reverse-side driven gear 404R with and from the traveling output shaft 47, respectively.

Specifically, the forward-side clutch mechanism 410F includes a forward-reverse clutch housing 412 supported by the traveling output shaft 47 in a manner not capable of relative rotation, a forward-side friction plate group 414F that includes a forward driven-side friction plate supported by the forward-reverse clutch housing 412 in a manner not capable of relative rotation and a forward drive-side friction plate supported by the forward-side driven gear 404F in a manner not capable of relative rotation in a state being superposed on the forward driven-side friction plate, and a forward-side piston (not illustrated) that frictionally engages the forward-side friction plate group 414F.

The reverse-side clutch mechanism 410R includes the forward-reverse clutch housing 412, a reverse-side friction plate group 414R that includes a reverse driven-side friction plate supported by the forward-reverse clutch housing 412 in a manner not capable of relative rotation and a reverse drive-side friction plate supported by the reverse-side driven gear 404R in a manner not capable of relative rotation so as to be superposed on the reverse driven-side friction plate, and a reverse-side piston (not illustrated) that engages the reverse-side friction plate group 414R.

The forward-reverse switching actuator 350 is operatively controlled by the control device in accordance with operations performed on the traveling state change member, so as to engage and disengage the forward-side clutch mechanism 410F and the reverse-side clutch mechanism 410R.

Figure 4:
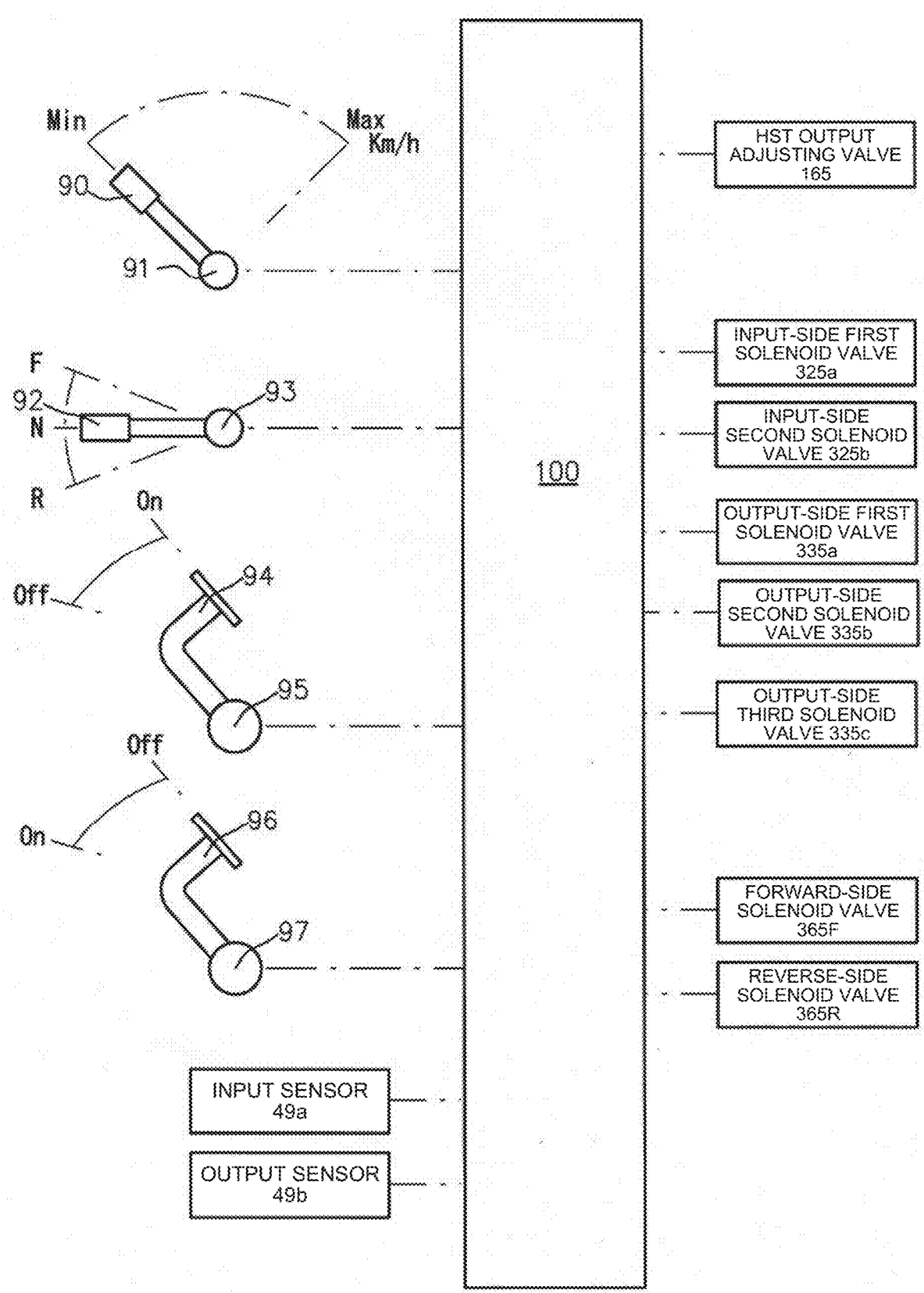
FIG. 4 is a block diagram illustrating a control device in the transmission structure according to the embodiment.

FIG. 4 is a block diagram of the control device 100.

As illustrated in FIG. 1 and FIG. 4, in this embodiment, the traveling state change member includes, in addition to the vehicle speed setting member 90, a forward-reverse switching operation member 92 for performing an operation of switching an output state of the transmission structure 1 among a forward drive traveling state, a reverse drive traveling state, and a neutral state.

The forward-reverse switching operation member 92 may be set to the neutral position N, the forward position F, and the reverse position R.

The operating position of the forward-reverse switching operation member 92 is detected by a forward-reverse switching sensor 93.

Note that, although the traveling state change member has the vehicle speed setting member 90 and the forward-reverse switching operation member 92 that are installed as separate bodies in this embodiment, instead of this, the traveling state change member may be formed by a single operation member. In the case where the traveling state change member is a single operation member, the traveling state change member may be operated so as to swing to the forward side and the reverse side across a vehicle speed zero position.

That is, upon recognizing that the forward-reverse switching operation member 92 is operated to the forward position F, the control device 100 operates the forward-reverse switching actuator 350 such that the forward-side clutch mechanism 410F is brought to an engaged state and the reverse-side clutch mechanism 410R is brought to a disengaged state. Furthermore, upon recognizing that the forward-reverse switching operation member 92 is operated to the reverse position R, the control device 100 operates the forward-reverse switching actuator 350 such that the forward-side clutch mechanism 410F is brought to a disengaged state and the reverse-side clutch mechanism 410R is brought to an engaged state. Furthermore, when the forward-reverse switching operation member 92 is positioned in the neutral position N, the control device 100 operates the forward-reverse switching actuator 350 such that both the forward-side clutch mechanism 410F and the reverse-side clutch mechanism 410R are brought to a disengaged state.

As illustrated in FIG. 2, the transmission structure 1 according to this embodiment has a forward-reverse switching hydraulic mechanism 352 as the forward-reverse switching actuator 350.

The forward-reverse switching hydraulic mechanism 352 uses the oil source (the first hydraulic pump 110) that is common to the charge line 130 of the HST 10, the hydraulic servo mechanism 152, and the transmission state switching hydraulic mechanism 302.

Specifically, as illustrated in FIG. 2, the forward-reverse switching hydraulic mechanism 352 further includes the clutch line 310, a forward-side supply-drain line 360F and reverse-side supply-drain line 360R having respective tip sides fluidly connected to the forward-side clutch mechanism 410F and the reverse-side clutch mechanism 410R, respectively, the forward-side solenoid valve 365F interposed between the clutch line 310 and the drain line 340 on one side and the forward-side supply-drain line 360F on the other side, and the reverse-side solenoid valve 365R interposed between the clutch line 310 and the drain line 340 on one side and the reverse-side supply-drain line 360R on the other side.

The forward-side solenoid valve 365F and the reverse-side solenoid valve 365R are operatively controlled by the control device 100 and may be positioned in a supply position that fluidly connects an appropriate one of the supply-drain lines 360F and 360R to the clutch line 310 and in a drain position that fluidly connects an appropriate one of the supply-drain lines 360F and 360R to the drain line 340.

Specifically, when recognizing that the forward-reverse switching operation member 92 is positioned in the forward position F, the control device 100 brings the forward-side solenoid valve 365F to the supply position and the reverse-side solenoid valve 365R to the drain position so that the forward-side clutch mechanism 410F is brought to an engaged state and the reverse-side clutch mechanism 410R is brought to a disengaged state, and accordingly, a forward-side drive traveling state is entered. When recognizing that the forward-reverse switching operation member 92 is positioned in the reverse position R, the control device 100 brings the forward-side solenoid valve 365F to the drain position and the reverse-side solenoid valve 365R to the supply position so that the forward-side clutch mechanism 410F is brought to a disengaged state and the reverse-side clutch mechanism 410R is brought to an engaged state. Accordingly, a reverse-side drive traveling state is entered. When recognizing that the forward-reverse switching operation member 92 is positioned in the neutral position N, both the forward-side solenoid valve 365F and the reverse-side solenoid valve 365R are positioned in the drain position so that both the forward-side clutch mechanism 410F and the reverse-side clutch mechanism 410R are brought to a disengaged state. Accordingly, a coasting traveling state in the forward direction or the reverse direction before the switching to the neutral position N is entered.

As illustrated in FIG. 2, in this embodiment, the forward-side solenoid valve 365F and the reverse-side solenoid valve 365R are solenoid switching valves that instantly increase/decrease the hydraulic pressure of the corresponding forward-side supply-drain line 360F and the reverse-side supply-drain line 360R.

As illustrated in FIG. 1 and FIG. 2, the transmission structure 1 according to this embodiment further includes an output-side third transmission mechanism 70c which is capable of operatively transmitting the rotational power of the first element to the traveling output shaft 47 as a drive rotational power in the forward direction, and an output-side third clutch mechanism 80c which engages and disengages the power transmission of the output-side third transmission mechanism 70c.

A gear ratio of the output-side third transmission mechanism 70c is set such that a rotation speed of the traveling output shaft 47 obtained at a time when the rotational power of the first element is operatively transmitted to the traveling output shaft 47 via the output-side third transmission mechanism 70c is higher than a rotation speed of the traveling output shaft 47 obtained at a time when the rotational power of the first element is operatively transmitted to the traveling output shaft 47 via the output-side second transmission mechanism 70b and the forward-side transmission mechanism 400F.

In this embodiment, the output-side third transmission mechanism 70c is capable of operatively transmitting the rotational power of the first element to the traveling output shaft 47 by means of the output-side second driven gear 74b of the output-side second transmission mechanism 70b.

Specifically, as illustrated in FIG. 1, the output-side third transmission mechanism 70c includes the output-side second driven gear 74b and the output-side third driven gear 74c which is operatively connected to the output-side second driven gear 74b in a state being supported by the traveling output shaft 47 in a manner capable of relative rotation.

The output-side third clutch mechanism 80c is supported by the traveling output shaft 47 such that the output-side third driven gear 74c is engaged with and disengaged from the traveling output shaft 47.

Specifically, the output-side third clutch mechanism 80c includes an output-side clutch housing 83 supported by the traveling output shaft 47 in a manner not capable of relative rotation, an output-side third friction plate group 84c that includes a third drive-side friction plate supported by the output-side third driven gear 74c in a manner not capable relative rotation and a third driven-side friction plate supported by the output-side clutch housing 83 in a manner not capable of relative rotation in a state being superposed on the third driving-side friction plate, and an output-side third piston (not illustrated) that frictionally engages the output-side third friction plate group 84c.

The output-side third clutch mechanism 80c is switched between engagement and disengagement by the clutch actuator 300.

As described above, the transmission structure 1 includes the transmission state switching hydraulic mechanism 302 as the transmission state switching actuator 300.

As illustrated in FIG. 2, the transmission state switching hydraulic mechanism 302 further includes an output-side third supply-drain line 330c having a downstream side fluidly connected to the output-side third clutch mechanism 80c, and an output-side third solenoid valve 335c interposed between the clutch line 310 and the drain line 340 on one side and the output-side third supply-drain line 330c on the other side.

The output-side third solenoid valve 335c is operatively controlled by the control device 100, and is positioned in a supply position that fluidly connects the corresponding supply-drain line 330c to the clutch line 310, and in a drain position that fluidly connects the corresponding supply-drain line 330c to the drain line 340.

As illustrated in FIG. 2, in this embodiment, the output-side third solenoid valve 335c is a solenoid proportional valve capable of adjusting an increasing/decreasing rate of the hydraulic pressure of the corresponding output-side third supply-drain line 330c, and accordingly, engagement may be performed while a frictional plate of the output-side third clutch mechanism 80c is slipped.

The work vehicle 200 includes a pair of right and left main traveling wheels as the traveling wheels 220. Accordingly, as illustrated in FIG. 1, the work vehicle 200 further includes a pair of main drive axles 250 that drive the pair of main traveling wheels, respectively, and a differential mechanism 260 that differentially transmits the rotational power of a traveling output shaft to the pair of main drive axles 250.

As illustrated in FIG. 1, the work vehicle 200 further includes a traveling brake mechanism 255 that selectively applies a braking force to the main drive axles 250, a differential lock mechanism 265 that forcibly drives the pair of main driving axles 250 in a synchronized manner using a rotational power from the traveling output shaft, and a drive force takeout mechanism 270 for subsidiary traveling wheels which is capable of selectively outputting a rotational power taken out from the traveling output shaft to the subsidiary traveling wheels.

The traveling brake mechanism 255 realizes a braking state in response to a braking ON operation of the braking operation member 96 (see FIG. 1 and FIG. 4). That is, when recognizing that the braking ON operation is performed with the braking operation member 96, the control device 100 operates a brake actuator (not illustrated) of the traveling brake mechanism 255 so as to perform a braking operation on the traveling wheels 220.

Furthermore, the work vehicle 200 includes a PTO shaft 280 that outputs a rotational power to the outside, and a PTO clutch mechanism 285 and a PTO multistage gear shift mechanism 290 that are interposed in a PTO transmission path extending from the drive source 210 to the PTO shaft 280.

Here, the gear shift control performed by the control device 100 will be described.

First, gear shift control of the control device 100 in a case where an acceleration operation is performed with the traveling state change member from the vehicle speed zero position toward the vehicle speed forward side will be described.

Figure 5:
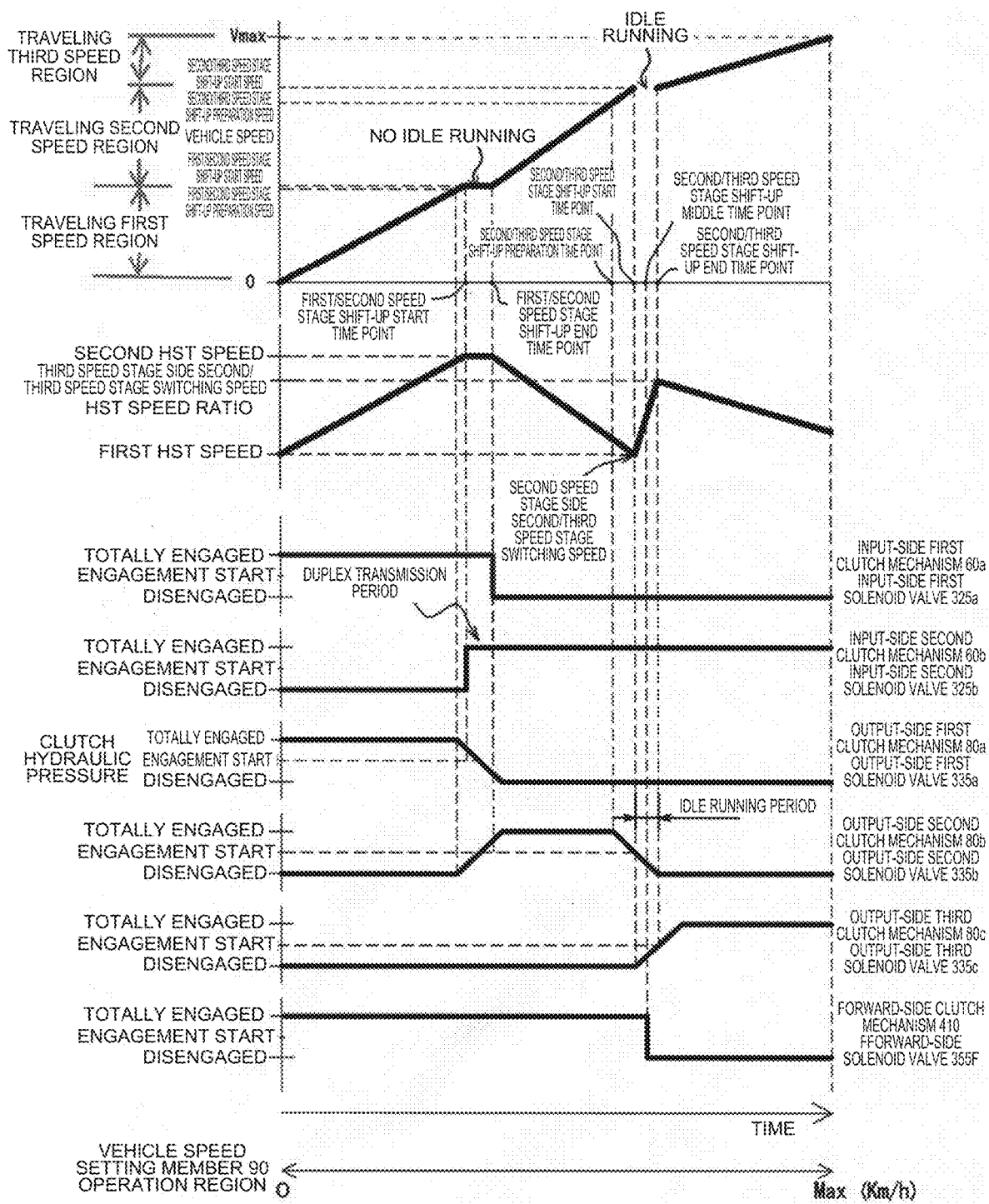
FIG. 5 is a graph illustrating the relationship between an elapsed time and a vehicle speed, an HST gear ratio, and oil pressures of clutch mechanisms in a case where an acceleration operation is performed on a vehicle speed setting member from a vehicle-speed zero position in a state in which a forward-reverse switching operation member is positioned in a forward position in the transmission structure according to the embodiment.

FIG. 5 is a graph illustrating the relationship between an elapsed time and a vehicle speed (drive speed in the transmission structure 1), the relationship between the elapsed time and an output rotation speed of the HST 10, and the relationship between the elapsed time and hydraulic pressure acting in the clutch mechanisms 60a and 60b, 80a to 80c, and 410F, in a case where an acceleration operation is performed on the vehicle speed setting member 90 from the lowest gear position Min while the forward-reverse switching operation member 92 is positioned in the forward position F.

In response to the operation of the forward-reverse switching operation member 92 to the forward position F, the control device 100 operates the forward-reverse switching actuator 350 so as to enter the forward-traveling drive state in which the forward-side clutch mechanism 410F is in the engaged state and the reverse-side clutch mechanism 410R is in the disengaged state.

In a traveling first gear range from a vehicle speed of zero to a predetermined first/second gear shift-up start speed, as illustrated in FIG. 5, the control device 100 operates the clutch actuator 300 so that the input-side first and second clutch mechanisms 60a and 60b are respectively brought to the engaged state and the disengaged state, and in this way, the first transmission state in which the first element functions as the reference power input section and the second element functions as the composite power output section which outputs the composite rotational power of the planetary gear mechanism 30 toward the gear shift output shaft 45.

Specifically, in the traveling first gear range based on one of the vehicle speed or the transmission rate of the transmission structure, the control device 100 positions the input-side first solenoid valve 325a in the supply position and the hydraulic pressure of the input-side first clutch mechanism 60a is determined as a setting hydraulic pressure used by the relief valve 142 (clutch complete engagement) and positions the input-side second solenoid valve 325b in the drain position and the hydraulic pressure of the input-side second clutch mechanism 60b becomes equivalent to the engagement hydraulic pressure (clutch disengagement) so that the first transmission state is entered.

Additionally, the control device 100 operates the clutch actuator 300 so that the output-side first and second clutch mechanisms 80a and 80b are respectively brought to the engaged state and the disengaged state, thereby entering the second element output state in which the rotational power of the second element is operatively transmitted to the gear shift output shaft 45.

Specifically, in the traveling first gear range, the control device 100 positions the output-side first solenoid valve 335a in the supply position and the hydraulic pressure of the output-side first clutch mechanism 80a is determined as a setting hydraulic pressure used by the output-side first clutch mechanism 80a (clutch complete engagement) and positions the output-side second solenoid valve 335b in the drain position and the hydraulic pressure of the output-side second clutch mechanism 80b becomes equivalent to the drain hydraulic pressure (clutch disengagement) so that the second element output state is entered.

On the other hand, in a traveling second gear range which comes after the first/second stage shift-up start speed and reaches a predetermined second/third stage shift-up start speed, the control device 100 operates the clutch actuator 300 so that the input-side first and second clutch mechanisms 60a and 60b are respectively brought to the engaged state and the disengaged state, and in this way, the second transmission state in which the second element functions as the reference power input section and the first element functions as the composite power output section is entered.

Specifically, in the traveling second gear range, the control device 100 positions the input-side first solenoid valve 325a in the drain position and the hydraulic pressure of the input-side first clutch mechanism 60a is determined as a drain hydraulic pressure (clutch disengagement) and positions the input-side second solenoid valve 325b in the supply position and the hydraulic pressure of the input-side second clutch mechanism 60b becomes equivalent to the setting hydraulic pressure (clutch complete engagement) so that the second transmission state is entered.

Additionally, the control device 100 operates the clutch actuator 300 so that the output-side first and second clutch mechanisms 80a and 80b are respectively brought to the disengaged state and the engaged state, thereby entering the first element output state in which the rotational power of the first element is operatively transmitted to the gear shift output shaft.

Specifically, in the traveling second gear range, the control device 100 positions the output-side first solenoid valve 335a in the drain position and the hydraulic pressure of the output-side first clutch mechanism 80a is determined as a drain hydraulic pressure (clutch disengagement) and positions the output-side second solenoid valve 335b in the supply position and the hydraulic pressure of the output-side second clutch mechanism 80b becomes equivalent to the setting hydraulic pressure (clutch complete engagement) so that the first element output state is entered.

As illustrated in FIG. 5, the planetary gear mechanism 30 is configured so that, in the first transmission state, the output rotational power of the second element becomes the zero speed when the HST gear ratio is set to the first HST gear, and the composite rotational power output from the second element is increased, and in the second transmission state, the composite rotational power output from the first element is increased as the HST gear ratio is shifted from the first HST gear side to the second HST gear side.

Furthermore, the gear ratio of the input-side first transmission mechanism 50a (input-side first gear ratio) and the gear ratio of the input-side second transmission mechanism 50b (input-side second gear ratio) are set so that the rotation speed of the second element at the time where the HST gear ratio is set to the second HST gear ratio in the first transmission state is the same as the rotation speed of the second element obtained by the rotational power transmitted via the input-side second transmission mechanism 50b in the second HMT transmission state. Furthermore, the gear ratio of the input-side first transmission mechanism 50a and the gear ratio of the input-side second transmission mechanism 50b are set so that the rotation speed of the first element at the time where the HST gear ratio is set to the second HST gear ratio in the second transmission state is the same as the rotation speed of the first element obtained by the rotational power transmitted via the input-side first transmission mechanism 50a in the first transmission state.

The control device 100 operates the gear shift actuator 150 (hydraulic serve mechanism 152 in this embodiment) so that the HST gear ratio becomes the first HST gear in accordance with an operation of moving the vehicle speed setting member 90 to the lowest speed position Min so that the drive rotational power of the zero speed is realized. Then the control device 100 operates the gear shift actuator 150 (hydraulic serve mechanism 152 in this embodiment) so that the HST gear ratio is changed from the first HST gear to the second HST gear in a range of the traveling first gear range in accordance with an acceleration operation of moving the vehicle speed setting member 90 from the lowest speed position Min so that the drive rotational power output from the second element in accordance with the acceleration operation performed on the vehicle speed setting member 90 in the first speed change region is increased.

In the shift-up from the traveling first gear range to the traveling second gear range performed in response to the acceleration operation using the vehicle setting member 90, the control device 100 instantly brings one of the pair of input-side clutch mechanisms 60a and 60b and a corresponding one of the pair of output-side clutch mechanisms 80a and 80b which is in the disengaged state in the first transmission state (second clutch mechanisms 60b and 80b in this embodiment) to the engaged state from the disengaged state.

At a time point when a first/second stage shift-up termination time point that comes after a predetermined period of time has elapsed from the first/second stage shift-up start time point, the clutch mechanisms formed by ones of the clutch mechanism pairs and engaged in the first transmission state (that is, the first clutch mechanisms 60a and 80a in this embodiment) is instantly shifted from the engaged state to the disengaged state. By this, while a shift-up duplex transmission state in which the first and second clutch mechanism in one of the pairs of clutch mechanisms are engaged is realized in a period of time from the first/second stage shift-up start time point to the first/second stage shift-up end time point, the first clutch mechanisms which are in the engaged state in the first transmission state in the other of the pair of input-side clutch mechanisms 60a and 60b and the other of the pair of output-side clutch mechanisms 80a and 80b are slid with a friction plate from the engaged state to the disengaged state, and in addition, the second clutch mechanisms which are in the disengaged state in the first transmission state in the others of the clutch mechanism pairs are slid with a friction plate from the disengaged state to the engaged state so that switching from the engaged state of the first clutch mechanisms to the engaged state of the second clutch mechanisms is performed.

According to the control described above, the shift-up from the first transmission state to the second transmission state may be smoothly performed without causing a power transmission cut-off state.

Furthermore, in this embodiment, the gear ratio of the output-side first transmission mechanism 70a (output-side first gear ratio) and the gear ratio of the output-side second transmission mechanism 70b (output-side second gear ratio) are set so that the rotation speed that is realized on the gear shift output shaft 45 when the HST gear ratio is the second HST gear in the first transmission state is substantially equivalent to the rotational speed realized on the gear shift output shaft 45 when the HST gear ratio is the second HST gear in the second transmission state.

According to this embodiment, as illustrated in FIG. 5, the first/second stage shift-up start speed corresponds to a traveling state realized when the HST gear ratio is the second HST gear in the first transmission state.

According to the above configuration, a change in a vehicle speed at the time of switching between the first and second transmission states may be efficiently suppressed or reduced.

Note that, as described above, in the present embodiment, the output-side first and second clutch mechanisms 80a and 80b are the friction-plate-type, and thus, even though a slight speed difference occurs in the gear shift output shaft 45 at the time of the switching of transmission states, the friction plate slides, so that the speed difference can be effectively absorbed.

The control device 100 recognizes the traveling state using the traveling sensor 49.

In this embodiment, the traveling sensor 49 includes an input sensor 49a for detecting the rotation speed (including a rotation direction) of drive force input to the transmission structure 1 (drive force input to the input-side first transmission mechanism 50a and the input-side second transmission mechanism 50b) and an output sensor 49b for detecting a rotation speed (drive speed and rotation direction) output from the transmission structure 1.

The output sensor 49b may directly or indirectly detect a vehicle speed, and detect rotation speeds of the traveling output shaft 47, the gear shift output shaft 45, and the motor shaft 16. In this embodiment, the output sensor 49b is disposed to detect a rotation speed of the traveling output shaft 47 as illustrated in FIG. 1.

In this embodiment, the input-side first and second solenoid valves 325a and 325b, which perform the switching between the supplying and draining of the pressurized oil to and from the input-side first and second clutch mechanisms 60a and 60b that form the input-side clutch mechanism pair, are solenoid switching valves, and the increasing and decreasing of the hydraulic pressures of the input-side first and second clutch mechanisms 60a and 60b are instantly performed so that engagement and disengagement of the clutches is instantly performed.

Meanwhile, the output-side first and second solenoid valves 335a and 335b, which perform the switching between the supplying and draining of the pressurized oil to and from the output-side first and second clutch mechanisms 80a and 80b that form the output-side clutch mechanism pair, are solenoid proportional valves, and an increasing rate and a decreasing rate of the hydraulic pressures of the output-side first and second clutch mechanisms 80a and 80b are adjustable.

In this case, the input-side clutch mechanism pair 60a and 60b is the one of the clutch mechanism pairs and the output-side clutch mechanism pair 80a and 80b is the other one of the clutch mechanism pairs.

That is, as illustrated in FIG. 5, the control device 100 moves the input-side second solenoid valve 325b from the drain position to the supply position at the first/second gear shift-up start time point, so that the input-side second clutch mechanism 60b, which is in the disengaged state in the first transmission state in the input-side clutch mechanism pair 60a and 60b, is instantly shifted to the engaged state from the disengaged state.

The control device 100 moves the input-side first solenoid valve 325a from the supply position to the drain position at the first/second gear shift-up start end point, so that the input-side first clutch mechanism 60a, which is in the engaged state in the first transmission state in the input-side clutch mechanism pair 60a and 60b, is instantly shifted to the disengaged state from the engaged state.

By this, in a period from the first/second gear shift-up start time point to the first/second gear shift-up end time point, a shift-up duplex transmission state, in which the input-side first and second clutch mechanisms 60a and 60b of the input-side clutch mechanism pair are engaged, is realized.

Furthermore, the control device 100 moves the output-side first solenoid valve 335a, which is a solenoid proportional valve, from the supply position to the drain position, so as to gradually decrease the hydraulic pressure of the output-side first clutch mechanism 80a from a set hydraulic pressure (clutch complete engagement) to a drain hydraulic pressure (clutch disengagement) via the engagement hydraulic pressure, thereby shifting the output-side first clutch mechanism 80a from the engaged state to the disengaged state with the sliding of the friction plate, and moves the output-side second solenoid valve 335b, which is a solenoid proportional valve, from the drain position to the supply position, so as to gradually increase the hydraulic pressure of the output-side second clutch mechanism 80b from the drain hydraulic pressure (clutch disengagement) to the set hydraulic pressure (clutch complete engagement) via the engagement hydraulic pressure, thereby moving the output-side second clutch mechanism 80b from the disengaged state to the engaged state with the sliding of the friction plate, and the switching from the engaged state of the output-side first clutch mechanism 80a to the engaged state of the output-side second clutch mechanism 80b is performed in the shift-up double transmission state.

In this embodiment, as illustrated in FIG. 5, the movement of the output-side first solenoid valve 335a from the supply position to the drain position and the movement of the output-side second solenoid valve 335b from the drain position to the supply position are performed before the first/second gear shift-up start time point.

Specifically, the control device 100 moves the output-side first solenoid valve 335a from the supply position to the drain position and moves the output-side second solenoid valve 335b from the drain position to the supply position at a time point when a traveling state recognized based on at least the vehicle speed or the TM gear ratio of the transmission structure reaches the first/second gear shift-up preparation speed which is lower by a predetermined speed than the first/second gear shift-up start speed.

In this case, regarding the output-side first and second solenoid valves 335a and 335b which are solenoid proportional valves, the hydraulic pressure of the output-side first clutch mechanism 80a is drained (clutch disengagement) from a setting hydraulic pressure (clutch complete engagement) in a period of time from the first/second gear shift-up start time point to the first/second gear shift-up end time point, and simultaneously, reaches the setting hydraulic pressure (clutch complete engagement) from the drain hydraulic pressure (clutch disengagement). Thereafter, a hydraulic pressure increasing/decreasing speed is set such that the hydraulic pressure of the output-side first clutch mechanism 80a is drained (clutch disengagement), and simultaneously, the hydraulic pressure of the output-side second clutch mechanism 80b reaches the setting hydraulic pressure (clutch complete engagement).

As illustrated in FIG. 5, when the vehicle speed setting member 90 is subjected to an acceleration operation after the vehicle speed enters the traveling second gear range, the control device 100 operates the gear shift actuator 150 so that the HST gear ratio is changed from a second HST shift side to a first HST shift side to thereby increase the vehicle speed.

The control device 100 performs the following operations when the vehicle speed is shifted from the traveling second gear range to the traveling third gear range of a higher speed than the traveling second gear range in response to an acceleration operation using the vehicle speed setting member 90.

1) At the second/third gear shift-up preparation time point when the traveling state reaches the predetermined second/third gear shift-up preparation speed, the control device 100 performs a shift from engagement to disengagement of the output-side second clutch mechanism 80b or the forward-side clutch mechanism 410F (the output-side second clutch mechanism 80b in FIG. 5) with sliding from the engagement to the disengagement.

2) At the second/third gear shift-up start time point after a predetermined period of time has elapsed from the second/third gear shift-up preparation time point, the output-side second clutch mechanism 80b or the forward-side clutch mechanism 410F is brought to the disengaged state or at the second/third gear shift-up start time point when the predetermined second/third gear shift-up start speed is reached as a traveling state, the engaged state or the disengaged state of the output-side second clutch mechanism 80b or the forward-side clutch mechanism 410F is instantly shifted from one to another so that the output-side second clutch mechanism 80b or the forward-side clutch mechanism 410 is brought to the disengaged state.

3) At the second/third gear shift-up middle time point after a predetermined period of time has elapsed from the second/third gear shift-up start time point, a shift from engagement to disengagement of the other of the output-side second clutch mechanism 80b and the forward-side clutch mechanism 410F (the forward-side clutch mechanism 410F in FIG. 5) is performed.

4) At the second/third gear shift-up end time point after a predetermined period of time has elapsed from the second/third gear shift-up middle time point, the output-side third clutch mechanism 80c is brought to the engaged state from the disengaged state. By this, in a period from the second/third gear shift-up start time point to the second/third gear shift-up end time point, a shift-up idling state in which a power transmission path to the traveling output shaft is blocked is realized.

Furthermore, the control device 100 changes the HST gear shift ratio to the second/third gear switching speed through the gear shift actuator 150 during the shift-up idling state, so that a drive traveling state (a vehicle speed, for example) realized via the output-side third transmission mechanism 70c matches or is close to a traveling state (or a vehicle speed) obtained immediately before the output-side third clutch mechanism 70c is brought to the engaged state.

Specifically, the third gear-side second/third gear switching ratio (gear ratio) is set so that a drive traveling state realized via the output-side third transmission mechanism 70c at the second/third gear shift-up end time point matches or is close to a drive traveling state obtained immediately before the output-side third clutch mechanism 70c s brought to the engaged state.

In the example illustrated in FIG. 5, the HST gear ratio is changed from the second gear-side second/third gear switching speed to the third gear-side second/third gear switching speed in the shift-up idling state in the period from the second/third gear shift-up start time point to the second/third gear shift-up end time point.

Note that, in this embodiment, the second/third gear shift-up start speed which defines the second/third gear shift-up start point is a vehicle speed realized by a rotational power that is operatively transmitted from the second element via the output-side second transmission mechanism 70b and the forward-side transmission mechanism 400F when the HST gear ratio is set to the first HST gear.

In this embodiment, as described above, the output-side third solenoid valve 335c that switches the supply and drain of the pressurized oil to and from the output-side third clutch mechanism 80c is a solenoid proportional valve.

The hydraulic pressure increasing rate of the output-side third solenoid valve 335c is set so that, in a predetermined time period from the second/third gear shift-up start time point to the second/third gear shift-up end time point, the hydraulic pressure of the output-side third clutch mechanism 80c is gradually increased from the drain hydraulic pressure (clutch disengagement) to the engagement hydraulic pressure.

In this case, by moving the output-side third solenoid valve 335c from the drain position to the supply position at the second/third shift-up start time point, the control device 100 can reliably realize the shift-up idling state in the period from the second/third gear shift-up start time point to the second/third gear shift-up end time point.

In the traveling third gear range, the control device 100 controls the operation of the gear shift actuator 150 performs operation of the gear shift actuator 150 so that a rotation speed of the drive rotation power is not changed between before and after the switching of the clutch mechanism, when the output-side first and second clutch mechanisms 80a and 80b are brought to a disengaged state and the output-side third clutch mechanism 80c is brought to an engaged state while the second transmission state is realized.

Specifically, as illustrated in FIG. 5, the control device 100 operates the gear shift actuator 150 so that the HST gear ratio is changed from the third gear-side second/third gear switching speed toward the first HST gear side. HST shift side to a first HST shift side to thereby increase the vehicle speed in response to an acceleration operation of the vehicle speed setting member 90 in the traveling third gear range.

Note that, in the traveling third gear range, power is not required to be transmitted from the gear shift output shaft 45 to the traveling output shaft 47, and therefore, the control device 100 when a vehicle speed is within the third gear range, and thus, as illustrated in FIG. 5, the control device 100 brings the forward-side clutch mechanism 410F to the disengaged state.

Next, the gear shift control of the control device 100 in a case where a deceleration operation is performed with the traveling state change member will be described.

Figure 6:
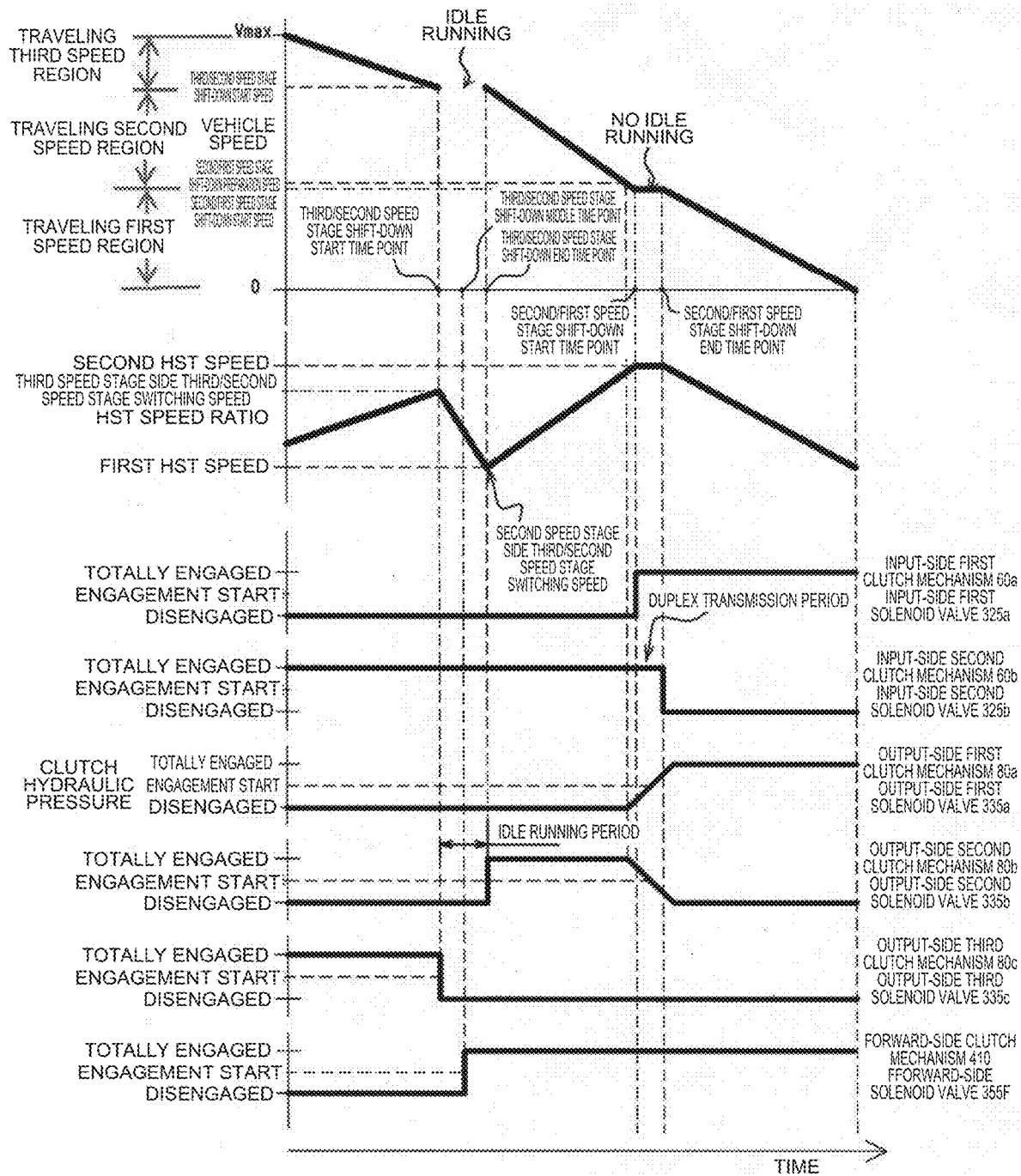
FIG. 6 is a graph illustrating the relationship between an elapsed time and a vehicle speed, an HST gear ratio, and oil pressures of the clutch mechanisms in a case where a deceleration operation is performed on the vehicle speed setting member in a state in which a vehicle speed is included in a third gear range while the forward-reverse switching operation member is positioned in the forward position in the transmission structure according to the embodiment.

FIG. 6 is a graph illustrating the relationship between an elapsed time and a vehicle speed (drive speed in the transmission structure 1), the relationship between the elapsed time and an output rotation speed of the HST 10, and the relationship between the elapsed time and hydraulic pressure of the clutch mechanisms 60a and 60b, 80a to 80c, and 410F, in a case where a deceleration operation is performed on the vehicle speed setting member 90 being in the traveling third gear range in a state in which the forward-reverse switching operation member 92 is in the forward position F.

As illustrated in FIG. 6, when the vehicle speed is in the traveling third gear range, the control device 100 brings the output-side first and second clutch mechanisms 80a and 80b to a disengaged state and the output-side third clutch mechanism 80c to an engaged state while the second transmission state is realized. The forward-side clutch mechanism 410F is in a disengaged state. The gear shift actuator 150 is operated so that the HST gear ratio is shifted from a side of the first HST gear to a side of the second HST gear in response to the acceleration operation of the vehicle speed setting member 92. Therefore, the rotation speed of the drive force operatively transmitted from the first element via the output-side third transmission mechanism 70c and the output-side third clutch mechanism 80c to the traveling output shaft 47 is reduced in accordance with the deceleration operation of using the vehicle speed setting member 90.

The control device 100 performs the following control when the vehicle speed is shifted from the traveling third gear range to the traveling second gear range, that is, at a time of shift-down, in response to the deceleration operation using the vehicle speed setting member 90.

1) When the vehicle speed reaches the predetermined third/second gear shift-down start speed, the output-side third clutch mechanism 80c is brought to a disengaged state from an engaged state (refer to FIG. 6). Alternatively, a shift of the output-side third clutch mechanism 80c from the engaged state to the disengaged state with sliding of the output-side third clutch mechanism 80c is started at the third/second gear shift-up preparation time point when the drive traveling state reaches a predetermined third/second gear shift-down preparation speed, and the output-side third clutch mechanism 80c is shifted from the engaged state to the disengaged state at a third/second gear shift-down start time point which comes after a predetermined period of time has elapsed from the third/second gear shift-down preparation time point.

2) At a third/second gear shift-down middle time point after a predetermined period of time has elapsed from the third/second gear shift-down start time point, the forward-side clutch mechanism 410F is brought to the engaged state from the disengaged state.

3) The output-side second clutch mechanism 80b is shifted from the disengaged state to the engaged state at the third/second gear shift-down end time point which comes after a predetermined period of time has elapsed from the third/second gear shift-down middle time point, so that a shift-down idling state in which a drive transmission path to the traveling output shaft 47 is blocked in a period of time from the third/second gear shift-down start time point to the third/second gear shift-down end time point.

4) Furthermore, the control device 100 causes the HST 10 to have a second-gear side third/second gear switching speed via the gear shift actuator 150 during the shift-down idling state, so that a drive traveling state realized via the output-side second transmission mechanism 70b and the forward-side transmission mechanism 400F at the third/second gear shift-down end time point matches or is close to a drive traveling state obtained immediately before the output-side second clutch mechanism 80b is brought to the engaged state.

In the example illustrated in FIG. 6, the HST 10 is shifted from the third gear-side third/second gear switching speed to the second gear-side third/second gear switching speed (first HST gear in this example) during the shift-down idling state in the period from the third/second gear shift-down start time point to the third/second gear shift-down end time point.

According to this control, the shift from the disengagement to the engagement of the output-side second clutch mechanism 80b at the time of the shift-down from the traveling third gear range to the traveling second gear range may be performed in a state in which a speed difference between a drive side and a driven side of the output-side second clutch mechanism 80b is reduced.

Accordingly, transmission of a large counter torque from the traveling output shaft 47 to the main drive shaft 212 may be suppressed at the time of the shift-down from the traveling third gear range to the traveling second gear range, and unanticipated stop of the drive source 210 due to excessive load may be efficiently suppressed.

Note that, in the configuration illustrated in FIG. 6, the third-gear side third/second gear switching speed is defined as such a speed that a drive traveling state, which is realized when the HST gear ratio is determined as the third-gear side third/second gear switching speed in a state in which the rotation power is operatively transmitted from the first element via the output-side third transmission mechanism 70c to the traveling output shaft 47, matches or is close to a drive traveling state which may be realized in a variable output range of the HST 10 in a state in which the rotation power is operatively transmitted from the first element via the output-side second transmission mechanism 70b and the forward-side transmission mechanism 400F to the traveling output shaft 47.

According to this embodiment, as illustrated in FIG. 6, the third-gear side third/second gear switching speed is defined as such a speed that a drive traveling state, which is realized when the HST gear ratio is determined as the third-gear side third/second gear switching speed in a state in which the rotation power is operatively transmitted from the first element via the output-side third transmission mechanism 70c to the traveling output shaft 47, matches or is close to a drive traveling state which may be realized when the HST gear ratio is the first HST gear in a state in which the rotation power is operatively transmitted from the first element via the output-side second transmission mechanism 70b and the forward-side transmission mechanism 400F to the traveling output shaft 47.

Preferably, the third-gear side third/second gear switching speed is substantially equivalent to the third-gear side second/third gear switching speed.

With this configuration, the control structure of the control device 100 may be simplified.

As illustrated in FIG. 6, in the traveling second gear range, the control device 100 operates the gear shift actuator 150 so that, while the second transmission state is realized, the output-side second clutch mechanism 80b and the forward-side clutch mechanism 410F are engaged, and after the output-side first and third clutch mechanisms 80a and 80c are brought to a disengaged state, an HST output is shifted from a side of the first HST gear to a side of the second HST gear in accordance with the deceleration operation of the vehicle speed setting member 90, and in this way, the drive traveling state (vehicle speed) is decelerated in accordance with the deceleration operation of the vehicle setting member 90.

The control device 100 is configured so that, when the vehicle speed is shifted down from the second gear range to the first gear range in response to a deceleration operation on the vehicle speed setting member 90, the first clutch mechanism (the input-side first clutch mechanism 60a) in one of the clutch mechanism pairs, i.e., the input-side clutch mechanism pair and the output-side clutch mechanism pair (for example, in the input-side clutch mechanism pair) is instantly shifted from the disengaged state to the engaged state at the second/first gear shift-down start time point where the vehicle speed reaches a predetermined speed (the second/first gear shift-down start speed), and the second clutch mechanism (the input-side second clutch mechanism 60b) in the one of the clutch mechanism pairs (in the input-side clutch mechanism pair) is instantly shifted from the engaged state to the disengaged state at the second/first gear shift-down end time point which comes after a predetermined period of time has elapsed from the second/first gear shift-down start time point, thereby realizing a shift-down double transmission state in which the first and second clutch mechanisms in the one of the clutch mechanism pairs (in the input-side clutch mechanism pair) are both engaged in a period from the second/first gear shift-down start time point to the shift-down end time point.

While the shift-down duplex transmission state, the first clutch mechanism (the output-side first clutch mechanism 80*a*) in the other clutch mechanism pair (the output-side clutch mechanism pair) among the input-side clutch mechanism pair and the output-side clutch mechanism pair is shifted with sliding of a friction plate from the disengaged state to the engaged state, and in addition, the second clutch mechanism (the output-side second clutch mechanism 80*b*) in the other clutch mechanism pair is shifted with sliding of a friction plate from the engaged state to the disengaged state, so that the switching from the engaged state of the second clutch mechanism to the disengaged state of the first clutch mechanism in the other clutch mechanism pair (the output-side clutch mechanism pair).

According to the above configuration, the shift-down from the second transmission state to the first transmission state may be smoothly performed without causing a power transmission cut-off state.

According to this embodiment, as illustrated in FIG. 6, the first/second gear shift-down start speed corresponds to a drive traveling state realized when the HST gear ratio is the second HST gear in the second transmission state.

As described above, in this embodiment, the output-side first and second solenoid valves 335*a* and 335*b*, which switch the supplying and draining of the pressurized oil to and from the output-side first and second clutch mechanisms 80*a* and 80*b* which form the output-side clutch mechanism pair, are solenoid proportional valves, and the increasing/decreasing rates of the hydraulic pressures of the output-side first and second clutch mechanisms 80*a* and 80*b* are adjustable.

In this case, the input-side clutch mechanism pair is the one of the clutch mechanism pairs and the output-side clutch mechanism pair is the other one of the clutch mechanism pairs.

In this embodiment, as illustrated in FIG. 6, the control device 100 moves the input-side first solenoid valve 325*a* from the drain position to the supply position at the second/first gear shift-down start time point, so that the input-side first clutch mechanism 60*a*, which is in the disengaged state in the second transmission state in the input-side clutch mechanism pair, is instantly shifted to the engaged state from the disengaged state, and moves the input-side second solenoid valve 325*b* from the supply position to the drain position at the second/first gear shift-down end time point, so that the input-side second clutch mechanism 60*b*, which is in the engaged state in the second transmission state in the input-side clutch mechanism pair, is instantly shifted to the disengaged state from the engaged state, thereby realizing the shift-down double transmission state in which the input-side first and second clutch mechanisms 60*a* and 60*b* in the input-side clutch mechanism pair are both engaged in the period from the first/second gear shift-down start time point to the shift-down end time point.

Furthermore, the control device 100 moves the output-side second solenoid valve 335*b*, which is a solenoid proportional valve, from the supply position to the drain position, so as to gradually decrease the hydraulic pressure of the output-side second clutch mechanism 80*b* from a set hydraulic pressure (clutch complete engagement) to a drain hydraulic pressure (clutch disengagement), thereby shifting the output-side second clutch mechanism 335*b* from the engaged state to the disengaged state with the sliding of the friction plate, and moves the output-side first solenoid valve 335*a*, which is a solenoid proportional valve, from the drain position to the supply position, so as to gradually increase the hydraulic pressure of the output-side first clutch mechanism 80*a* from the drain hydraulic pressure (clutch disengagement) to the set hydraulic pressure (clutch complete engagement), thereby moving the output-side second clutch mechanism 80*b* from the disengaged state to the engaged state with the sliding of the friction plate, and the switching from the engaged state of the output-side second clutch mechanism 80*b* to the engaged state of the output-side first clutch mechanism 80*a* is performed in the shift-down duplex transmission state.

In this embodiment, as illustrated in FIG. 6, the movement of the output-side second solenoid valve 335*b* from the supply position to the drain position and the movement of the output-side first solenoid valve 335*a* from the drain position to the supply position are performed before the second/first gear shift-down start time point.

Specifically, the control device 100 is configured to move the output-side second solenoid valve 335*b* from the supply position to the drain position and move the output-side first solenoid valve 335*a* from the drain position to the supply position at the time point when the drive traveling state reaches the second/first gear shift-down preparation speed, which is higher than the second/first gear shift-down start speed by a predetermined speed.

In this case, regarding the output-side first and second solenoid valves 335*a* and 335*b* which are solenoid proportional valves, the hydraulic pressure increasing/decreasing rates are set so that, during the shift-down double transmission state from the second/first gear shift-down start time point to the second/first gear shift-down end time point, the hydraulic pressure of the output-side first clutch mechanism 80*a* becomes equal to or greater than the engagement hydraulic pressure from the drain hydraulic pressure (clutch disengagement), and the hydraulic pressure of the output-side second clutch mechanism 80*b* becomes less than the engagement hydraulic pressure from the set hydraulic pressure (clutch complete engagement), and after a predetermined period of time elapses from the second/first gear shift-down end time point, the hydraulic pressure of the output-side first clutch mechanism 80*a* reaches the set hydraulic pressure (clutch complete engagement) and the hydraulic pressure of the output-side second clutch mechanism 80*b* reaches the drain hydraulic pressure (clutch disengagement).

Note that, according to this embodiment, the output-side first and second solenoid valves 335*a* and 335*b* are solenoid proportional valves and the hydraulic pressures of the first and second clutch mechanisms 80*a* and 80*b* are gradually increased and decreased, and meanwhile, the input-side first and second solenoid valves 325*a* and 325*b* are solenoid switching valves, and the hydraulic pressures of the input-side first and second clutch mechanisms 60*a* and 60*b* are instantly increased and decreased as described above. However, as a matter of course, the present invention is not limited to the above embodiment.

For example, a modification in which the output-side first and second solenoid valves 335*a* and 335*b* are solenoid switching valves and the input-side first and second solenoid valves 325*a* and 325*b* are solenoid proportional valves may also be employed.

According to this embodiment, the control device 100 blocks drive force transmission to the traveling wheels 220 in accordance with an input of a power cut-off signal, such as a braking operation signal supplied from the braking operation member 96 or a clutch cancel operation signal supplied from a clutch operation member 94 (refer to FIG. 1 and FIG. 4) during traveling with a shift gear (for example, a forward first gear) determined based on an operation state of the traveling state change member (an operation direction in the forward direction, for example, of the forward-reverse switching operation member 90 in this embodiment) and the drive traveling state (a vehicle speed and/or a gear ratio). This causes the vehicle 10 to coasting travel. Note that, when the coasting travel is performed in response to a braking operation signal, braking is applied to the traveling wheels 220.

Thereafter, when the drive traveling state is resumed in response to an input of a cancel signal of the power cut-off signal (that is, a braking cancel operation signal from the braking operation member 96 or a clutch engagement operation signal from the clutch operation member), the following control is performed.

Note that an operation state of the clutch operation member 94 is detected by the clutch operation sensor 95.

First, a case where the power cut-off signal is input in a drive traveling state in which an operation position of the traveling state change member (the forward-reverse switching operation member 90 in this embodiment) is the forward position F and a gear shift determined based on a traveling state is the forward first gear will be described.

In the forward first gear, as described above, the input-side first clutch mechanism 60a, the output-side first clutch mechanism 80a, and the forward-side clutch mechanism 410F are in an engaged state and the other clutch mechanisms are in a disengaged state.

When the power cut-off signal is input in the forward first gear drive traveling state, the control device 100 actuates the clutch actuator 300 so that only one of the clutch mechanism in a downstream in the transmission direction (the forward-side clutch mechanism 410F in this example) among the clutch mechanisms in the engaged state to realize the first gear is brought to the disengaged state, and the other clutch mechanisms (the input-side first clutch mechanism 60a and the output-side first clutch mechanism 80a in this example) are maintained in the engaged state.

While the power cut-off signal is valid (that is, until a signal for canceling the power cut-off signal is input), the control device 100 determines a presumed gear which is in a traveling direction corresponding to an operation state of the traveling state change member (an operation direction of the forward-reverse switching operation member 90 in this embodiment) and which corresponds to a coasting traveling state at that time, brings a clutch mechanism on a most downstream side in the transmission direction among the plurality of clutch mechanisms which for the presumed gear into a disengaged state, and operates the clutch actuator 300 so that the other clutch mechanisms are brought to the engaged state. Meanwhile, the control device 100 operates the gear shift actuator 150 so that an HST gear ratio that realizes a traveling state at that time with the presumed gear is obtained.

It is assumed, at a first time point when the power cut-off signal is valid, that the traveling state change member is in the forward position F and the coasting traveling state detected based on a signal supplied from the traveling sensor 49 is the traveling first gear range. The control device 100 determines that the forward first gear is a presumed gear at the first time point, and in addition, operates the clutch actuator 300 to bring only a clutch mechanism on a most downstream side in the transmission direction among the clutch mechanisms that realize the first gear, that is, only the forward-side clutch mechanism 410F to a disengaged state. The others of the clutch mechanisms which realize the forward first gear, that is, the input-side first clutch mechanism 60a and the output-side first clutch mechanism 80a are engaged. Subsequently, the gear shift actuator 150 is operated so as to obtain the HST gear ratio for realizing the traveling state detected at the first time point in the forward first gear.

It is assumed, at a second time point when the power cut-off signal is valid, that the traveling state change member is in the forward position F and the coasting traveling state detected based on a signal supplied from the traveling sensor 49 is the traveling second gear range. The control device 100 determines that the forward second gear is a presumed gear at the second time point, and in addition, operates the clutch actuator 300 to bring only a clutch mechanism on a most downstream side in the transmission direction among the clutch mechanisms that realize the second gear, that is, only the forward-side clutch mechanism 410F to a disengaged state. The others of the clutch mechanisms which realize the forward second gear, that is, the input-side second clutch mechanism 60b and the output-side second clutch mechanism 80b are engaged. Subsequently, the gear shift actuator 150 is operated so as to obtain the HST gear ratio for realizing the traveling state detected at the second time point in the forward second gear.

It is assumed, at a third time point when the power cut-off signal is valid, that the traveling state change member is in the forward position F and the coasting traveling state detected based on a signal supplied from the traveling sensor 49 is the traveling third gear range. The control device 100 determines that the forward third gear is a presumed gear at the third time point, and in addition, operates the clutch actuator 300 to bring only a clutch mechanism on a most downstream side in the transmission direction among the clutch mechanisms that realize the third gear, that is, only the output-side clutch mechanism 80c to a disengaged state. The others of the clutch mechanisms which realize the forward third gear, that is, the input-side second clutch mechanism 60b is engaged. Subsequently, the gear shift actuator 150 is operated so as to obtain the HST gear ratio for realizing the traveling state detected at the third time point in the forward third gear.

Thereafter, when the cancel signal of the power cut-off signal (that is, a braking cancel operation signal supplied from the braking operation member 96 or a clutch engagement operation signal supplied from the clutch operation member) is input, the control device 100 operates the clutch actuator 300 so that one of the clutch mechanisms on a most downstream side in the transmission direction in the presumed gear at the time point is shifted from the disengaged state to the engaged state.

With this configuration, in the drive traveling state in which the traveling state change member is operated in one of the forward direction and the reverse direction, when the drive force transmission is blocked in response to an input of the power cut-off signal and thereafter the drive traveling state is restored in response to the signal for canceling the power cut-off signal, the drive-side member and the driven-side member in the clutch mechanism which is brought to the engaged state from the disengaged state may be engaged with each other while a relative rotation speed difference of the drive-side member and the driven-side member is suppressed or reduced.

Specifically, when the drive traveling state is shifted to the drive force transmission block state in response to an input of the power cut-off signal, in the general configuration in which all the clutch mechanisms (the input-side first clutch mechanism 60a, the output-side first clutch mechanism 80a, and the forward-side clutch mechanism 410F in the example described above) are brought to the disengaged state, in the drive force transmission block state, the driven-side members of the clutch mechanism on the most downstream side in the transmission direction is operatively coupled with the traveling wheels, and the transmission members including the drive-side members (including the drive-side member of interest) of the clutch mechanism on the most downstream side in the transmission direction to the driven-side members (including the driven-side member of interest) of the clutch mechanism on the most upstream side in the transmission direction are brought to a coasting traveling state in which the transmission member is not operatively coupled with any of the drive source and the traveling wheels.

With this general configuration, a continuously variable transmission output may not be reflected in the drive-side members of the clutch mechanism on the most downstream side in the transmission direction even when the HST gear ratio is changed while the power cut-off signal is valid. Therefore, when the drive traveling state is restored, the clutch mechanism on the most downstream side in the transmission direction is required to be brought to the engaged state from the disengaged state in a state in which a rotation speed difference is large between the drive-side members and the driven-side members, and accordingly, the traveling feeling is deteriorated.

On the other hand, according to this embodiment, the shift from the disengaged state to the engaged state of the clutch mechanism on the most downstream side in the transmission direction in the restoration to the drive traveling state may be performed in a state in which the rotation speed difference between the drive-side members and the driven-side members is suppressed or reduced, and accordingly, the traveling feeling is improved.

Furthermore, according to this embodiment, when forward traveling and reverse traveling is repeatedly performed in a short period of time by a so-called reverser operation which is an operation of the forward-reverse switching operation member 92 from the neutral position N to the forward position F or the reverse position R, while the vehicle speed setting member 90 is located in a desired position, acceleration may be immediately performed and improved traveling feeling may be attained.

Specifically, the reverser operation is performed when the forward-reverse switching operation member 92 is quickly operated from the neutral position N to the forward position F or the reverse position R and vice versa in a repetitive manner in a state in which the vehicle speed setting member 90 is located in a predetermined operation position (generally, an operation position corresponding to the traveling first gear range).

With the general configuration, when the forward-reverse switching operation member 92 is located in the neutral position N, all the clutch mechanisms to be brought to the engaged state when the forward-reverse switching operation member 92 is located in the forward position F or the reverse position R are brought to the disengaged state and enter the coasting traveling state. (The clutch mechanisms are hereinafter referred to as "clutch mechanism to be engaged". In the traveling first gear range, when the forward-reverse switching operation member 92 is operated from the forward position F (or the reverse position R) to the neutral position NF, the input-side first clutch mechanism 60a, the output-side first clutch mechanism 80a, and the forward-side clutch mechanism 410F (or the reverse-side clutch mechanism 410R) are determined as the "clutch mechanisms to be engaged".)

According to the general configuration, the clutch mechanism (the forward-side clutch mechanism 410F or the reverse-side clutch mechanism 410R in this embodiment) disposed on a most downstream side in the transmission direction among the clutch mechanisms to be engaged has driven members operatively coupled to the traveling wheels 220 and driven members disconnected from the drive source 210, and furthermore, the clutch mechanism (the input-side first clutch mechanism 60a in this embodiment) disposed on a most upstream side in the transmission direction among the clutch mechanism to be engaged has drive members operatively coupled with the drive source 210 and driven members disconnected from the traveling wheels 220.

Accordingly, with the general configuration, when the reverser operation is performed forward side, for example, regarding the input-side first clutch mechanism 60a and the forward-side clutch mechanism 410F, the drive members and the driven members having large rotation speed differences are engaged with each other, and therefore, the traveling feeling is degraded.

Furthermore, according to the general configuration, when the forward-reverse switching operation member 92 is repeatedly operated (reverser operation) from the neutral position N to the forward position F or the reverse position R, hydraulic oil is required to be supplied to all the clutch mechanisms to be engaged to attain engagement, and efficient start acceleration may not be attained due to shortage of supply of the hydraulic oil. A rotational speed of the pump for supplying the hydraulic oil is proportional to a rotational speed of the drive source 210, and therefore, particularly when the rotational speed of the drive source 210 is low, the shortage of the hydraulic oil supply becomes remarkable, and it becomes difficult to quickly shift all of the clutch mechanisms to be engaged to the engaged state.

Conversely, according to this embodiment, the control device 100 executes the following operation control at a time of the reverser operation.

Specifically, when determining that the forward-reverse switching operation member 92 is operated from the forward position F or the reverse position R to the neutral position N in a state in which the vehicle speed setting member 90 is located in a predetermined position, the control device 100 operates the clutch actuator 300 so that one of the clutch mechanisms (that is, one of the forward-side clutch mechanism 410F, the reverse-side clutch mechanism 410R, and the output-side third clutch mechanism 80c) on the most downstream side in the transmission direction in a shift gear engaged at this time point is brought to a disengaged state.

Thereafter, while the neutral signal is valid (that is, while the forward-reverse switching operation member 92 is in the neutral position N), the control device 100 determines a presumed gear shift corresponding to a coasting traveling state at this time point, a disengaged state of one of the clutch mechanisms which is on the most downstream side in the transmission direction in the presumed gear shift (that is, one of the forward-side clutch mechanism 410F, the reverse-side clutch mechanism 410R, and the output-side third clutch mechanism 80c) is maintained, and operates the clutch actuator 300 so that the others of the clutch mechanisms which configures the presumed shift gear are brought to an engaged state, and in this state, operates the gear shift actuator 150 so that an HST gear ratio which realizes a traveling state at the time point by the presumed shift gear is obtained.

It is assumed, at the first time point when the neutral signal is valid, that the coasting traveling is performed in the traveling first gear range detected based on a signal supplied from the traveling sensor 49.

The control device 100 determines that the first gear is the presumed shift gear at the first time point, and in addition, operates the clutch actuator 300 to maintain the disengaged state of the forward-side clutch mechanism 410F and the reverse-side clutch mechanism 410R. Among the clutch mechanisms which realize the first gear, the input-side first clutch mechanism 60a and the output-side first clutch mechanism 80a are engaged. Subsequently, the gear shift actuator 150 is operated so that the HST gear ratio for realizing the traveling state detected at the first time point is obtained in the first gear.

It is assumed, at the second time point when the neutral signal is valid, that the coasting traveling is performed in the traveling second gear range detected based on a signal supplied from the traveling sensor 49.

The control device 100 determines that the second gear is the presumed shift gear at the second time point, and in addition, operates the clutch actuator 300 to maintain the disengaged state of the forward-side clutch mechanism 410F and the reverse-side clutch mechanism 410R. Among the clutch mechanisms which realize the second gear, the input-side second clutch mechanism 60b and the output-side second clutch mechanism 80b are engaged. Subsequently, the gear shift actuator 150 is operated so that the HST gear ratio for realizing the traveling state detected at the second time point is obtained in the second gear.

Thereafter, when the forward-reverse switching operation member 92 is operated from the neutral position N to the forward position F or the reverse position R, the control device 100 actuates the clutch actuator 300 so that the forward-side clutch mechanism 410F or the reverse-side clutch mechanism 410R corresponding to the operation position of the forward-reverse switching operation member 92 is brought to an engaged state.

Specifically, according to this embodiment, when the presumed shift gear at a time point when the forward-reverse switching operation member 92 is in the forward position F or the reverse position R is the first gear, the input-side first clutch mechanism 60a and the output-side first clutch mechanism 80a are brought to an engaged state, and in addition, in a state in which an HST gear ratio that realizes the traveling state at this time point in the first gear is obtained, only a corresponding one of the forward-side clutch mechanism 410F and the reverse-side clutch mechanism 410R is brought to an engaged state from a disengaged state.

Alternatively, when the presumed shift gear at a time point when the forward-reverse switching operation member 92 is in the forward position F or the reverse position R is the second gear, the input-side second clutch mechanism 60b and the output-side second clutch mechanism 80b are brought to an engaged state, and in addition, in a state in which an HST gear ratio that realizes the traveling state at this time point in the second gear is obtained, only a corresponding one of the forward-side clutch mechanism 410F and the reverse-side clutch mechanism 410R is brought to an engaged state from a disengaged state.

Therefore, when the forward-side clutch mechanism 410F or the reverse-side clutch mechanism 410R corresponding to the reverse operation is brought to the engaged state from the disengaged state, the hydraulic oil is supplied at least the forward-side clutch mechanism 410F or the reverse-side clutch mechanism 410R, and furthermore, the drive members and the driven members of the corresponding one of the forward-side clutch mechanism 410F and the reverse-side clutch mechanism 410R are brought to an engaged state in a state in which a relative speed difference is suppressed or reduced. Therefore, when the vehicle is started by the reverser operation, smooth acceleration can be realized, and the traveling feeling can be improved.

Next, a first modification of the shift gear control of the control device 100 will be described.

According to the first modification, in a drive traveling state in which a vehicle traveling direction recognized based on at least one of a vehicle speed and a TM gear ratio (for example, a TM gear ratio based on a signal supplied from the input sensor 49a and a signal supplied from the output sensor 49b) when the traveling state change member (the forward-reverse switching operation member 92) is in the forward position or the reverse position matches a forward-reverse operation direction of the traveling state change member, drive force transmission to the traveling wheels 220 is blocked in response to an input of a power cut-off signal, such as a braking operation signal supplied from the braking operation member 96 or a clutch cancel operation signal supplied from the clutch operation member 94 (refer to FIG. 1 and FIG. 4). Thereafter, the drive traveling state is resumed in response to an input of a cancel signal of the power cut-off signal (that is, a braking cancel operation signal supplied from the braking operation member 96 or a clutch engagement operation signal supplied from the clutch operation member), and the shift gear control relates to the above control.

When a power cut-off signal is input in a drive traveling state in which the forward-reverse operation direction of the forward-reverse switching operation member 92 matches a traveling direction of the vehicle recognized based on at least one of a vehicle speed and a TM gear ratio, the control device 100 actuates the clutch actuator 300 so that only a clutch mechanism on a most downstream side in a transmission direction among the plurality of clutch mechanisms which realize the coasting traveling state with the selected shift gear.

In the first modification, while the power cut-off signal is valid in a state in which the forward-reverse switching operation member 92 is subjected to a forward operation or a reverse operation, the control device 100 determines a shift gear corresponding to the traveling state as a presumed shift gear except for a case where a traveling direction of the vehicle recognized based on at least one of the vehicle speed and the TM gear ratio is different from the forward-reverse operation forward-reverse operation direction of the forward-reverse switching operation member 92 and a speed (or a gear ratio) in the coasting traveling state is equal to or smaller than a threshold value in the vicinity of a predetermined zero speed.

In addition, when the traveling direction of the vehicle is different from the forward-reverse operation direction of the forward-reverse switching operation member 92 and a speed (or a gear ratio) in the coasting traveling state is equal to or smaller than the threshold value in the vicinity of the zero speed, the control device 100 determines a shift gear which corresponds to an output rotation direction corresponding to an operation direction of the forward-reverse switching operation member 92 and which corresponds to a speed (or a gear ratio) in the traveling state as a presumed shift gear.

Figure 7:
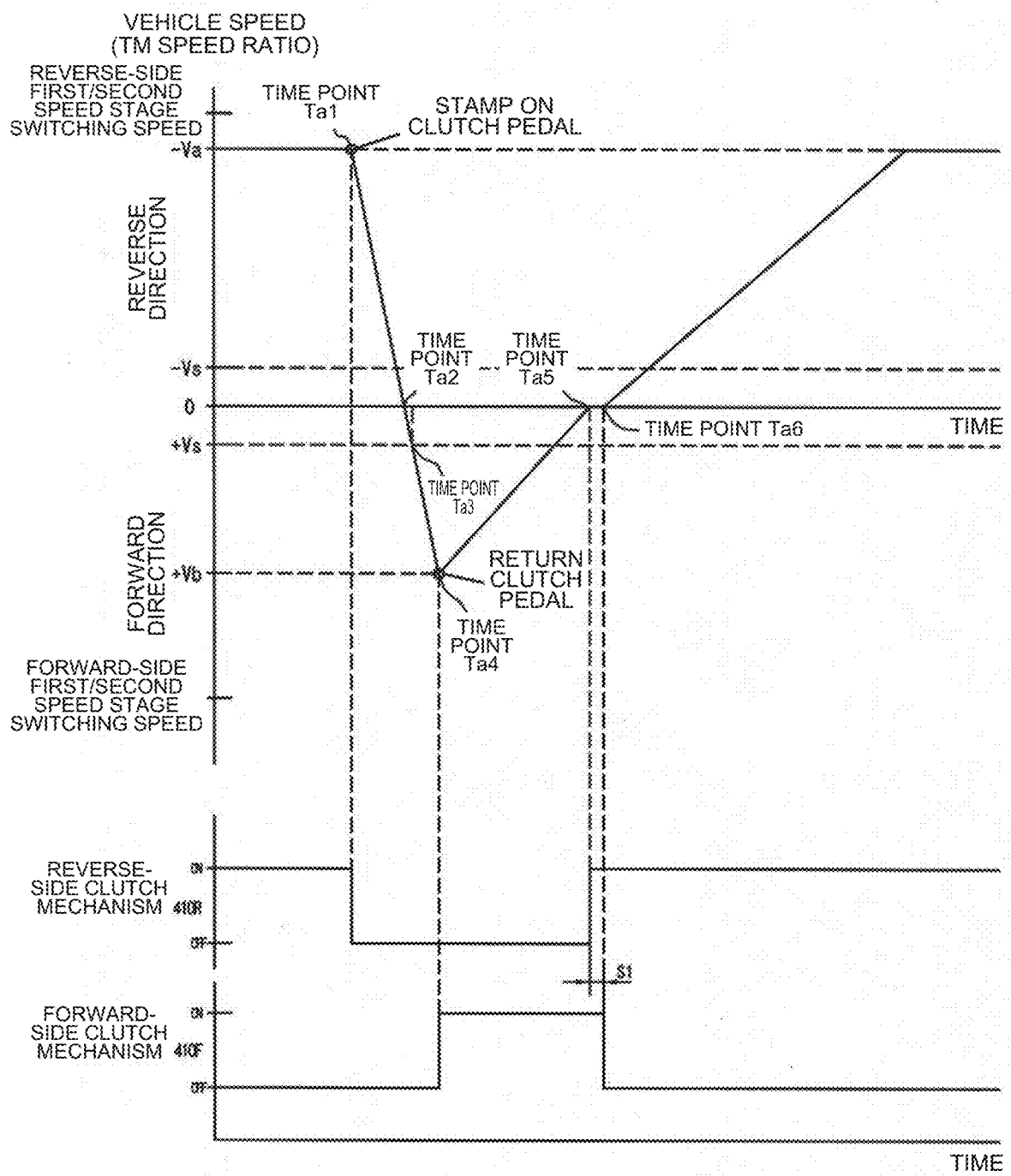
FIG. 7 is a graph of changes in a vehicle speed (or TM gear ratio) and changes in the engaged/disengaged states of a forward-side clutch mechanism and a reverse-side clutch mechanism in a first traveling example in which a power cut-off signal, such as a clutch cut-off signal, is input during reverse drive travel on an uphill slope.

FIG. 7 is a graph of changes in a vehicle speed (or TM gear ratio) and changes in the engaged/disengaged states of a forward-side clutch mechanism 410F and a reverse-side clutch mechanism 410R in a traveling example (hereinafter referred to as a first traveling example) in which a power cut-off signal, such as a clutch cut-off signal, is input during reverse drive travel on a slope with a vehicle speed (or a TM gear ratio) of −Va in the traveling first gear range in a state in which the forward-reverse switching operation member 92 is in the reverse position R.

Furthermore, FIG. 8A is a diagram illustrating the relationships between a traveling state recognized based on a vehicle speed and/or a TM gear ratio and a presumed shift gear when a power cut-off signal is valid in a state in which the forward-reverse operation member 92 is in the reverse position R.

FIG. 8B is a diagram illustrating the relationship between a traveling state and a presumed shift gear while the power cut-off signal is valid in a state in which the forward-reverse switching operation member 92 is in the neutral position N, and FIG. 8C is a diagram illustrating the relationship between a traveling state and a presumed shift gear while the power cut-off signal is valid in a state in which the forward-reverse switching operation member 92 is in the forward position F.

In the first traveling example illustrated in FIG. 7, a clutch pedal is pressed at a time point Ta1 so that a power cut-off signal, such as a clutch cancel signal, is input, and thereafter, the clutch pedal is returned at a time point Ta4 so that a signal of canceling the power cut-off signal is input.

In accordance with the power cut-off signal at the time point Ta1, the control device 100 actuates the clutch actuator 300 so that the reverse-side clutch mechanism 410R which is a clutch mechanism on a most downstream side in the transmission direction in a shift gear at this time point (that is, a reverse first gear) is brought to a disengaged state.

When the power cut-off state is set while the vehicle is climbing a hill in a rearward direction, a vehicle speed −Va in the reverse direction is reduced due to a vehicle weight.

In the first traveling example of FIG. 7, the vehicle speed in the reverse direction is reduced to zero speed at the time point Ta2, and then becomes a vehicle speed of +Vb in the forward direction at the time point Ta4 at which the signal of canceling the power cut-off signal is input.

In the first traveling example, in a period in which the drive traveling state is the reverse direction (the time point Ta1 to the time point Ta2) and a period in which a vehicle speed (or a TM gear ratio) is equal to or smaller than a threshold value Vs in the vicinity of zero speed although the traveling state is a forward direction which is opposite to the reverse direction which is an operation direction of the forward-reverse switching operation member 92 (the time point Ta2 to a time point Ta3), the control device 100 determines that a reverse first gear is the presumed gear shift (refer to FIG. 8A).

Therefore, the period from the time point Ta1 to the time point Ta2 and the period from the time point Ta2 to the time point Ta3, the control device 100 actuates the gear shift actuator 150 so that an HST gear ratio for realizing an output state corresponding to a vehicle speed at that time point is obtained while actuating the clutch actuator 300 so that only the reverse-side clutch mechanism 410 R is brought to a disengaged state among the plurality of clutch mechanisms which realize the presumed shift gear.

Thereafter, when the coasting traveling state in which the vehicle speed (or the TM gear ratio) exceeds the threshold value Vx in the vicinity of zero speed (after the time point T3), the control device 100 determines a shift gear corresponding to the vehicle traveling direction and corresponding to the vehicle speed (the TM gear ratio) as a presumed shift gear.

Therefore, the period after the time point Ta3, the control device 100 actuates the gear shift actuator 150 so that an HST gear ratio for realizing an output state corresponding to the vehicle speed at that time point is obtained while actuating the clutch actuator 300 so that only the forward-side clutch mechanism 410F which is the clutch mechanism on the most downstream side in the transmission direction is brought to a disengaged state among the plurality of clutch mechanisms which realize the presumed shift gear.

Thereafter, when the signal of canceling the power cut-off signal is input at the time point Ta4, the control device 100 actuates the clutch actuator 300 so that the clutch mechanism (that is, the forward-side clutch mechanism 410F) on the most downstream side in the transmission direction of the forward first shift gear determined as the presumed shift gear at that time point is brought to the engaged state from the disengaged state, and actuates the gear shift actuator 150 so that a vehicle speed (or a TM gear ratio) in accordance with an operation position of the vehicle speed setting member 90.

In this state, the vehicle speed (or the TM gear ratio) in the forward direction is reduced by the engine brake effect, and at a time point Ta5, the vehicle speed (or the TM gear ratio) becomes substantially zero speed (including approximately zero speed).

When the vehicle speed (or the TM gear ratio) in the traveling state becomes substantially zero speed, the control device 100 outputs drive force in the reverse direction which is an operation direction of the forward-reverse switching operation member 92 and determines a shift gear (that is, a reverse first gear) corresponding to the vehicle speed (or the TM gear ratio) in the traveling state as a shift gear to be brought to an engaged state.

Specifically, the control device 100 actuates the clutch actuator 300 so that the reverse-side clutch mechanism 410R is brought to an engaged state at the time point Ta5.

As illustrated in FIG. 7, in the first traveling example, the forward-side clutch mechanism 410F is brought to the engaged state to realize the presumed shift gear at that time point in response to an input of the signal of canceling the power cut-off signal, and thereafter, brought to the disengaged state at a time point Ta6 after a predetermined period of time S1 elapses from the time point Ta5 when the shift gear (the reverse first gear) corresponding to the forward-reverse operation of the forward-reverse switching operation member 92 in accordance with the traveling state which is substantially the vehicle zero speed is brought to the engaged state. The predetermined period of time S1 is set such that the forward-side clutch mechanism 410F and the reverse-side clutch mechanism 410R are brought to duplex engagement in order to suppress occurrence of an unintended power cut-off state.

Alternatively, the forward-side clutch mechanism 410F may be brought to a disengaged state at the time point Ta5 when the reverse-side clutch mechanism 410R is brought to the engaged state.

Subsequently, shift gear control in another traveling example (hereinafter referred to as a second traveling example) performed when the power cut-off signal, such as a clutch cut-off signal, is input while a vehicle is climbing a hill in a reverse direction with a vehicle speed (or a TM gear ratio) of −Va in the traveling first gear range by operating the forward-reverse switching operation member 92 to the reverse position R.

Figure 9:
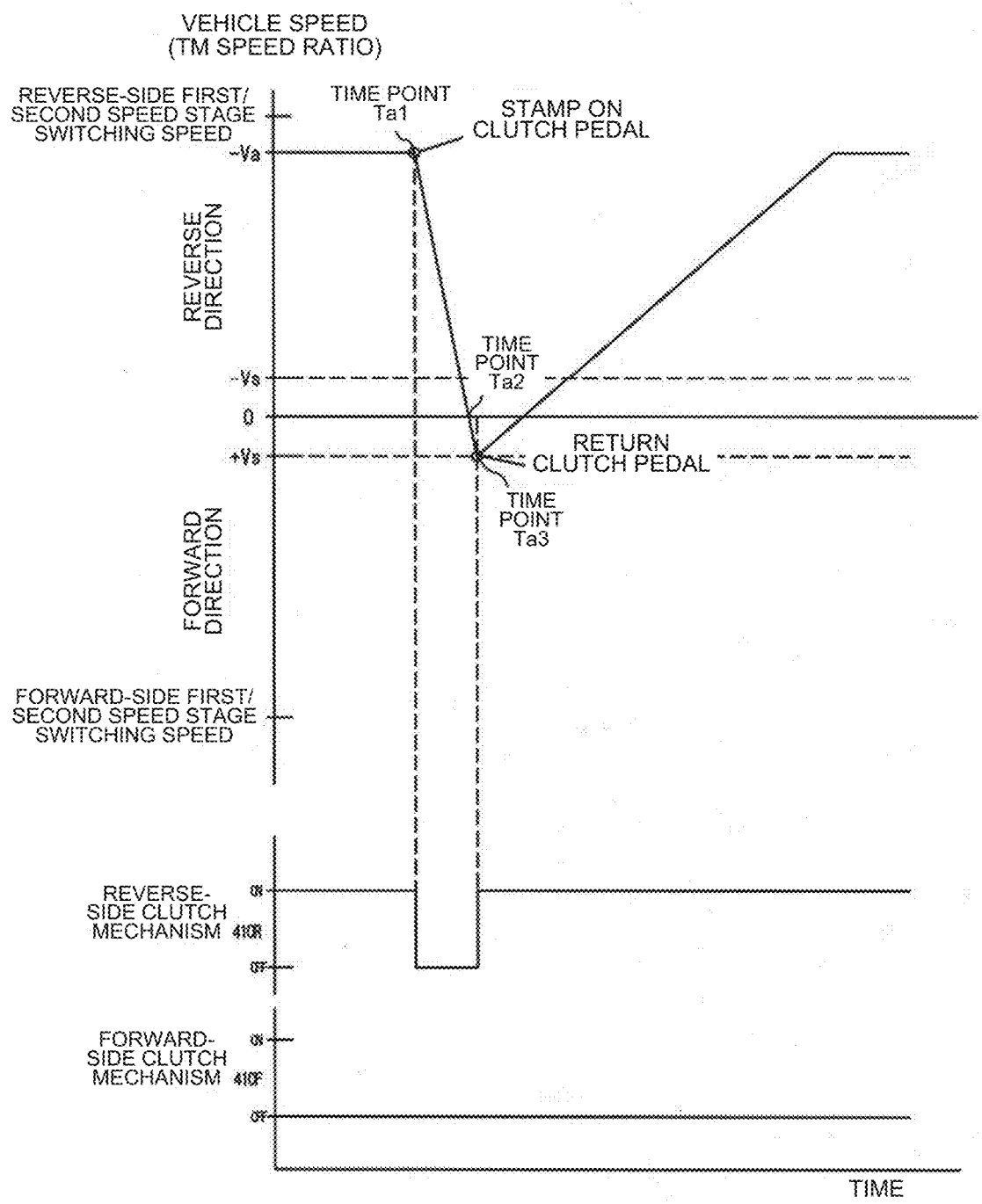
FIG. 9 is a graph of a change in a vehicle speed (or TM gear ratio) and changes in the engaged/disengaged states of the forward-side clutch mechanism and the reverse-side clutch mechanism in a second traveling example in which a power cut-off signal, such as a clutch cut-off signal, is input during reverse drive traveling on a slope.

FIG. 9 is a graph of changes in a vehicle speed (or TM gear ratio) and changes in the engaged/disengaged states of a forward-side clutch mechanism 410F and a reverse-side clutch mechanism 410R in the second traveling example.

The second traveling example of FIG. 9 is the same as the first traveling example in that the power cut-off signal is input when the clutch pedal is pressed at the time point Ta1, the vehicle speed (or the TM gear ratio) in the coasting traveling state becomes zero speed at the time point T2, a direction is the forward direction which is opposite to the reverse direction which is an operation direction of the forward-reverse switching operation member 92 and the vehicle speed (or the TM gear ratio) corresponds to the threshold value Vs in the vicinity of zero speed at the time point Ta3, and is different from the first traveling example in the vehicle speed (or the TM gear ratio) at a time when the signal of canceling the power cut-off signal is input due to stop of the press of the clutch pedal.

Specifically, in the second traveling example, the signal of canceling the power cut-off signal is input at the time point Ta3 when the traveling direction of the vehicle is the forward direction which is opposite to the operation direction (reverse direction) of the forward-reverse switching operation member and the vehicle speed (or TM gear ratio) becomes the threshold value Vs in the vicinity of zero speed.

Therefore, the control device 100 determines that the reverse first gear is the presumed shift gear at the time point Ta3 when the signal of canceling the power cut-off signal is input.

Therefore, the control device 100 actuates the clutch actuator 300 at the time point Ta3 so that the reverse-side clutch mechanism 410R which is a clutch mechanism on a most downstream side in the transmission direction among the plurality of clutch mechanisms which realize the reverse first shift gear corresponding to the presumed shift gear is brought to an engaged state.

Next, a second modification relating to shift gear control of the control device 100 will be described.

The second modification relates to a shift gear control performed when, in a drive traveling state in which a vehicle traveling direction recognized based on at least one of a vehicle speed and a TM gear ratio (for example, a TM gear ratio based on a signal supplied from the input sensor 49a and a signal supplied from the output sensor 49b) when the traveling state change member (the forward-reverse switching operation member 92) is in the forward position or the reverse position matches a forward-reverse operation direction of the forward-reverse switching operation member 92, a drive force output is blocked in response to an operation of the forward-reverse switching operation member 92 to the N position, and thereafter, a drive force output corresponding to the forward-reverse operation of the forward-reverse switching operation member 92 is resumed in accordance with an operation of the forward-reverse switching operation member 92 from the forward position F to the reverse position R and vice versa.

Figure 10:
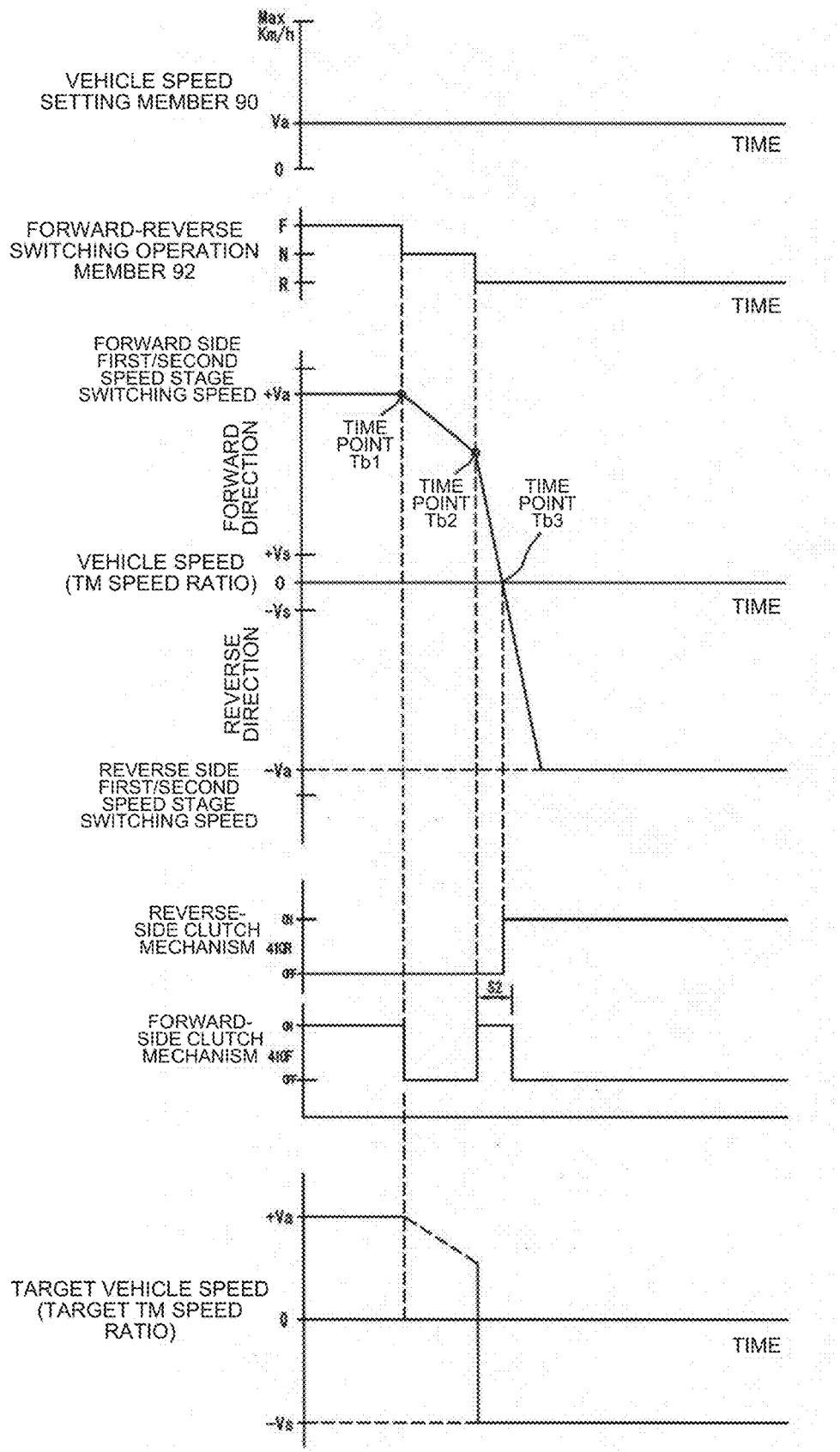
FIG. 10 is a graph of a change in a vehicle speed (or TM gear ratio) and changes in the engaged/disengaged states of the forward-side clutch mechanism and the reverse-side clutch mechanism in a third traveling example in which the forward-reverse switching operation member is operated from a forward position F through the neutral position N to the reverse position R during forward drive traveling.

FIG. 10 is a graph of a change in a vehicle speed (or TM gear ratio) and changes in the engaged/disengaged states of the forward-side clutch mechanism 410F and the reverse-side clutch mechanism 410R in a traveling example (hereinafter referred to as a third traveling example) in which the forward-reverse switching operation member 92 is operated from the forward position F through the neutral position N to the reverse position R during forward drive traveling.

In the third traveling example of FIG. 10, the forward-reverse switching operation member 92 is operated from the forward position F to the neutral position N at the time point Tb1 during drive traveling in the forward direction at a vehicle speed (or TM gear ratio) of Va of the traveling first gear range corresponding to an operation position of the vehicle speed setting member 90 in a state in which the forward-reverse switching operation member 92 is located in the forward position F.

The control device 100 actuates the clutch actuator 300 so that the forward-side clutch mechanism 410F is brought to the disengaged state from the engaged state in response to an operation of the forward-reverse switching operation member 92 from the F position to the N position at the time point Tb1.

In a period from the time point Tb1 to the time point Tb2, the forward-reverse switching operation member 92 is in the neutral position N, and therefore, the control device 100 determined a presumed shift gear based on a traveling direction of the vehicle recognized based on a vehicle speed and/or a TM gear ratio and the vehicle speed (or TM gear ratio) (refer to FIG. 8B).

A traveling direction in the period from the time point Tb1 to the time point Tb2 when the forward-reverse switching operation member 92 is at the neutral position N is the forward direction, and the vehicle speed (or TM gear ratio) is in the traveling first gear range which is lower than the first/second gear switching speeds.

Therefore, in the period from the time point Tb1 to the time point Tb2, the control device 100 determines that the forward first gear is a presumed shift gear, and in addition, operates the clutch actuator 300 to bring only the forward-side clutch mechanism 410F on the most downstream side in the transmission direction among the clutch mechanisms that realize the first gear to the disengaged state. The other clutch mechanisms are in the engaged state. Subsequently, the gear shift actuator 150 is operated so that the HST gear ratio for realizing an output state in accordance with a vehicle speed at the time point is obtained.

When the forward-reverse switching operation member 92 is operated from the neutral position N to the reverse position R at the time point Tb2, the control device 100 actuates the clutch actuator 300 so that the clutch mechanism (the forward-side clutch mechanism 410F in the third traveling example of FIG. 10) on the most downstream side in the transmission direction in the presumed shift gear at the time point is brought to the engaged state.

Thereafter, in a period in which the vehicle traveling direction is the forward direction (from the time point Tb2 to the time point Tb3), the control device 100 actuates the clutch actuator 300 so that the shift gear (the forward first gear in the third traveling example of FIG. 10) corresponding to the vehicle traveling direction and the vehicle speed (or TM gear ratio) is realized, and in addition, actuates the gear shift actuator 150 while the vehicle speed (or TM gear ratio) corresponding to the operation position of the vehicle speed setting member 90 is determined as a target vehicle speed (or target TM gear ratio).

In a state in which the power cut-off signal is not input, switching between a forward-side shift gear and a reverse-side shift gear is performed in response to a vehicle traveling direction switching operation.

Specifically, in the state in which the power cut-off signal is not input, the control device 100 selects a shift gear to be engaged based on the vehicle traveling direction and the vehicle speed (or TM gear ratio).

In the third traveling example of FIG. 10, after the time point Tb3 when the vehicle traveling direction is switched to the reverse direction, the control device 100 selects the shift gear (the reverse first gear in the third traveling example of FIG. 10) corresponding to the vehicle speed (or TM gear ratio) in the traveling state at the time point as the shift gear to be engaged, and actuates the clutch actuator 300 so that the plurality of clutch mechanisms which realize the selected shift gear are brought to the engaged state.

As described above, in the period from the time point Tb2 to the time point Tb3, the input-side first clutch mechanism 60a, the output-side first clutch mechanism 80a, and the forward-side clutch mechanism 410F which realize the forward-side first gear are brought to the engaged state.

Therefore, after the time point Tb3, the control device 100 actuates the clutch actuator 300 so that the reverse-side clutch mechanism 410R which is in the disengaged state for realizing the reverse-side first gear is brought to the engaged state while brings the input-side first clutch mechanism 60a and the output-side first clutch mechanism 80a are brought to the engaged state.

Note that, in the third traveling example of FIG. 10, one of the clutch mechanisms (that is the forward-side clutch mechanism 410F) which is brought to the engaged state for realizing a shift gear for outputting drive force in a direction different from the operation direction of the forward-reverse switching operation member 92 at the time point Tb2 when the forward-reverse switching operation member 92 is operated from the neutral position N to the reverse position R is brought to the disengaged state after a predetermined period of time S2 elapses from the time point Tb2 when the engaged state is attained. The predetermined period of time S2 is set such that the forward-side clutch mechanism 410F and the reverse-side clutch mechanism 410R are brought to duplex engagement in order to suppress occurrence of an unintended power cut-off state.

Alternatively, the forward-side clutch mechanism 410F may be brought to the disengaged state at the time point Tb3 when the reverse-side clutch mechanism 410R is brought to the engaged state.

Note that the control device 100 may make the determination of a presumed shift gear to be engaged based on a value of the TM gear ratio, and make the determination as to whether the traveling speed has exceeded the threshold value in the vicinity of zero speed based on a vehicle speed.

Note that the continuously variable transmission may be an electric motor capable of performing inverse drive and outputting continuously variable transmission gear instead of the HST of this embodiment.

REFERENCE SIGNS LIST

1 transmission structure
10 continuously variable transmission (hydraulic continuously variable transmission)
20 output adjusting member
30 planetary gear mechanism
45 gear shift output shaft
47 traveling output shaft
49a input sensor (traveling sensor)
49b output sensor (traveling sensor)
50a, 50b input-side first and second transmission mechanisms
60a, 60b input-side first and second clutch mechanisms
70a to 70c output-side first to third transmission mechanisms
80a to 80c output-side first to third clutch mechanisms
90 vehicle speed setting member (traveling state change member)
91 vehicle speed setting sensor
92 forward-reverse switching operation member (traveling state change member)
93 forward-reverse switching sensor
94 clutch operation member
96 braking operation member
100 control device
150 gear shift actuator
152 hydraulic servo mechanism
210 drive source
220 traveling wheel
400F, 400R forward-side and reverse-side transmission mechanisms
410F, 410R forward-side and reverse-side clutch mechanisms

The invention claimed is:

1. A transmission structure interposed in a transmission path extending from a drive source to traveling wheels, the transmission structure comprising:
    transmission mechanisms which have a plurality of shift gears and a plurality of clutch mechanisms disposed for the plurality of shift gears;
    a clutch actuator that performs engagement and disengagement of the plurality of clutch mechanisms;
    a continuously variable transmission mechanism that continuously varies speeds of rotation power in the plurality of shift gears;
    a gear shift actuator that performs an operation of changing an output of the continuously variable transmission mechanism;
    a traveling state change member that is operable by a person; and
    a control device that actuates, in a drive traveling state in which a vehicle traveling direction recognized based on at least one of a vehicle speed and a transmission (TM) gear ratio of the transmission structure when the traveling state change member is in a forward position or a reverse position matches a forward-reverse operation direction of the traveling state change member, the clutch actuator so that a clutch mechanism which realize a shift gear corresponding to a traveling state at that time point is brought to an engaged state, and in addition, the gear shift actuator so that a drive rotation speed corresponding to an operation state of the traveling state change member in the shift gear is obtained, wherein the control device
    (1) actuates the clutch actuator, when a power cutoff signal is input during the drive traveling, so that only one of the clutch mechanisms on a most downstream side in a transmission direction in the selected shift gear is brought to a disengaged state,
    (2) determines a presumed shift gear to be selected in a coasting traveling state caused by power cutoff, actuates the clutch actuator so that only one of the clutch mechanisms on the most downstream side in the transmission direction in the presumed shift gear is brought to a disengaged state and the other clutch mechanisms are brought to an engaged state, and in addition, actuates the gear shift actuator so as to obtain a hydrostatic transmission (HST) speed ratio which realizes an output state corresponding to a vehicle speed at that time point in the presumed shift gear, and
    (3) actuates the clutch actuator, when a drive traveling state is resumed due to an input of a cancel signal for canceling a power cut-off signal in a state in which the traveling state change member is subjected to a forward operation or a reverse operation, so that the clutch mechanism on the most downstream side in the transmission direction in the presumed shift gear at the time point is brought to an engaged state.

2. The transmission structure according to claim 1, wherein
the transmission mechanisms include a planetary gear mechanism which has a first element, a second element, and a third element which functions as an input section of a continuously variable transmission output, an input-side first transmission mechanism capable of operatively transmitting rotation power of the drive source to the first element, an input-side second transmission mechanism capable of operatively transmitting rotation power of the drive source to the second element, an output-side first transmission mechanism capable of operatively transmitting rotation power of the second element to a gear shift output shaft disposed on a downstream side in a transmission direction relative to the input-side first and second transmission mechanisms, an output-side second transmission mechanism capable of operatively transmitting rotation power of the first element to the gear shift output shaft, and a forward-side transmission mechanism and a reverse-side transmission mechanism which output rotation power of the gear shift output shaft as forward drive force and reverse drive force to the traveling wheels,
the clutch mechanisms include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and a forward-side clutch mechanism and a reverse-side clutch mechanism which engage or disengage power transmission of the forward-side transmission mechanism and the reverse-side transmission mechanism, respectively, and
the control device determines the presumed shift gear such that,
(1) in a case where the coasting traveling state is in a traveling first gear range, a first gear which is realized when the input-side first clutch mechanism, the output-side first clutch mechanism, and the forward-side clutch mechanism or the reverse-side clutch mechanism are brought to the engaged state is determined as the presumed shift gear, and
(2) in a case where the coasting traveling state is in a traveling second gear range of a speed higher than the traveling first gear range, a second gear which is realized when the input-side second clutch mechanism, the output-side second clutch mechanism, and the forward-side clutch mechanism or the reverse-side clutch mechanism are brought to the engaged state is determined as the presumed shift gear.

3. The transmission structure according to claim 2, wherein
the traveling state change member includes a vehicle speed setting member and a forward-reverse switching operation member, and
the control device actuates the gear shift actuator in response to an operation of the vehicle speed setting member and actuates the clutch actuator so that switching between engagement and disengagement of the forward-side and reverse-side clutch mechanisms is performed in response to an operation of the forward-reverse switching operation member.

4. The transmission structure according to claim 2, wherein
when the cancel signal for canceling the power cut-off signal is input for resuming to the drive traveling state, the control device operatively controls the clutch actuator and the gear shift actuator such that,
(1) when the vehicle traveling direction is the same as a forward-reverse operation direction of the traveling state change member or when the vehicle traveling direction is opposite to the forward-reverse operation direction of the traveling state change member but has a value equal to or smaller than a threshold value in the vicinity of zero speed set in advance, the forward-side clutch mechanism or the reverse-side clutch mechanism corresponding to the forward-reverse operation direction of the traveling state change member is determined to be a clutch mechanism on the most downstream side in the transmission direction in the presumed shift gear and is brought to an engaged state,
(2) when the vehicle traveling direction is opposite to the forward-reverse operation direction of the traveling state change member and has a value larger than the threshold value in the vicinity of zero speed, the forward-side clutch mechanism or the reverse-side clutch mechanism which is opposite to the forward-reverse operation direction of the traveling state change member is determined to be a clutch mechanism on the most downstream side in the transmission direction in the presumed shift gear and is brought to an engaged state, and
(3) when the forward-side clutch mechanism or the reverse-side clutch mechanism which is opposite to the forward-reverse operation direction of the traveling state change member is determined to be a clutch mechanism on the most downstream side in the transmission direction in the presumed shift gear and is brought to an engaged state, the clutch mechanism is brought to a disengaged state at a predetermined timing and furthermore the forward-side clutch mechanism or the reverse-side clutch mechanism corresponding to the forward-reverse operation direction of the traveling state change member is brought to an engaged state in accordance with zero speed of the traveling state.

5. The transmission structure according to claim 4, wherein
the predetermined timing is a time point at which a predetermined period of time set in advance has elapsed from a time point at which the forward-side clutch mechanism or the reverse-side clutch mechanism corresponding to the forward-reverse operation direction of the traveling state change member is brought to an engaged state.

6. The transmission structure according to claim 4, wherein
the predetermined timing is a time point at which the forward-side clutch mechanism or the reverse-side clutch mechanism corresponding to the forward-reverse operation direction of the traveling state change member is brought to an engaged state.

7. The transmission structure according to claim 2, wherein
the transmission mechanisms further include a traveling output shaft operatively coupled with the gear shift output shaft via the forward-side transmission mechanism and the reverse-side transmission mechanism, and an output-side third transmission mechanism which is capable of operatively transmitting rotation power of the first element as forward drive force to the traveling output shaft and which has a gear ratio set such that a rotation speed of the traveling output shaft obtained when rotation power of the first element is operatively transmitted to the traveling output shaft via the output-side third transmission mechanism is higher than a rotation speed of the traveling output shaft obtained when the rotation power of the first element is operatively transmitted to the traveling output shaft via the output-side second transmission mechanism and the forward-side transmission mechanism, the clutch mechanisms further include an output-side third clutch mechanism which engages or disengages power transmission of the output-side third transmission mechanism, and the control device
determines, in a traveling third gear range of a speed higher than the traveling second gear range recognized based on at least one of the vehicle speed and the TM gear ratio, a forward third gear which is realized when the input-side second clutch mechanism and the output-side third clutch mechanism are brought to an engaged state as a presumed shift gear.

8. The transmission structure according to claim 7, wherein,
when the cancel signal for canceling the power cut-off signal is input for resuming to the drive traveling state, the control device
(1) determines, when the vehicle traveling direction recognized based on at least one of the vehicle speed and the TM gear ratio is the same as a forward-reverse operation direction of the traveling state change member or when the vehicle traveling direction is opposite to the forward-reverse operation direction of the traveling state change member but has a value equal to or smaller than a threshold value in the vicinity of zero speed set in advance, a shift gear which corresponds to the traveling direction corresponding to the forward-reverse operation direction of the traveling state change member and which corresponds to a vehicle speed at that time point as a presumed shift gear, and
(2) determines, when the vehicle traveling direction is opposite to the forward-reverse operation direction of the traveling state change member and has a value larger than the threshold value in the vicinity of zero speed, a shift gear which corresponds to a direction opposite to the forward-reverse operation direction of the traveling state change member and which corresponds to a vehicle speed at that time point as the presumed shift gear.

9. The transmission structure according to claim 4, wherein
the control device determines whether the threshold value in the vicinity of zero speed is exceeded based on a vehicle speed while making a determination of a presumed shift gear to be brought to an engaged state based on a TM gear ratio.

10. A transmission structure interposed in a transmission path extending from a drive source to traveling wheels, the transmission structure comprising:
transmission mechanisms which have a plurality of shift gears and a plurality of clutch mechanisms for selecting a desired shift gear from among the plurality of shift gears, and a forward-side clutch mechanism and a reverse-side clutch mechanism which are capable of realizing a forward drive traveling state in which the traveling wheels are driven in a forward direction and a reverse drive traveling state in which the traveling wheels are driven in a reverse direction, respectively;

a clutch actuator that performs an engagement operation and a disengagement operation of the plurality of clutch mechanisms;
a continuously variable transmission mechanism that continuously varies rotation power in the plurality of shift gears;
a gear shift actuator that performs an operation of changing an output of the continuously variable transmission mechanism;
a traveling state change member selectively operable to a forward position, a neutral position, or a reverse position for determining a traveling direction of a vehicle; and
a control device which operatively controls the clutch actuator and the gear shift actuator,
wherein the control device
(1) actuates, in a drive traveling state in which the vehicle traveling direction matches an operation position of the traveling state change member, the clutch actuator so that a clutch mechanism for a shift gear corresponding to the traveling state at that time point is brought to an engaged state, and in addition, the gear shift actuator to obtain a drive rotation speed corresponding to an operation state of the traveling state change member in the shift gear,
(2) actuates, when the traveling state change member is operated from the forward position or the reverse position to the neutral position, the clutch actuator so that both the forward-side clutch mechanism and the reverse-side clutch mechanism are brought to a disengaged state and a coasting traveling state is realized,
(3) determines a presumed shift gear corresponding to the coasting traveling state, actuates the clutch actuator so that only one of the clutch mechanisms on a most downstream side in a transmission direction corresponding to the presumed shift gear is brought to a disengaged state and the other clutch mechanisms are brought to an engaged state, and in addition, actuates the gear shift actuator so as to obtain a gear ratio of a continuously variable transmission mechanism which realizes a vehicle speed at that time point with the presumed shift gear, and
(4) actuates the clutch actuator so that the clutch mechanism on the most downstream side in the transmission direction in the presumed shift gear at the time point is brought to an engaged state when the drive traveling state is resumed from the coasting traveling state to the drive traveling state by an operation of the traveling state change member.

11. The transmission structure according to claim 10, wherein
the control device brings, when the presumed shift gear at a time of resuming to the drive traveling state by an operation of the traveling state change member is a shift gear which outputs rotation drive force in a direction different from the traveling direction instructed by the traveling state change member, the clutch mechanism on the most downstream side in the transmission direction, which is brought to the engaged state at the time of the resuming to the drive traveling state, to a disengaged state after a predetermined period of time has elapsed.

12. The transmission structure according to claim 10, wherein
the control device brings, when the presumed shift gear at a time of resuming to the drive traveling state by an operation of the traveling state change member is a shift gear which outputs rotation drive force in a direction different from the traveling direction instructed by the traveling state change member, the clutch mechanism, which is brought to the engaged state at the time of the resuming to the drive traveling state, to a disengaged state at a timing when a clutch mechanism on the most downstream side in the transmission direction in a next shift gear is brought to an engaged state.

13. The transmission structure according to claim 11, wherein
the transmission mechanisms include a planetary gear mechanism which has a first element, a second element, and a third element which functions as an input section of a continuously variable transmission output, an input-side first transmission mechanism capable of operatively transmitting rotation power of the drive source to the first element with an input-side first gear ratio, an input-side second transmission mechanism capable of operatively transmitting rotation power of the drive source to the second element with an input-side second gear ratio, an output-side first transmission mechanism capable of operatively transmitting rotation power of the second element to a gear shift output shaft disposed on a downstream side in the transmission direction relative to the input-side first and second transmission mechanisms with an output-side first gear ratio, an output-side second transmission mechanism capable of operatively transmitting rotation power of the first element to the gear shift output shaft with an output-side second gear ratio, and a forward-side transmission mechanism and a reverse-side transmission mechanism which output the rotation power of the gear shift output shaft as forward drive force and reverse drive force to the traveling wheels, and
the clutch mechanisms include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and forward-side and reverse-side clutch mechanisms which engage or disengage power transmission of the forward-side and reverse-side transmission mechanisms, respectively.

14. The transmission structure according to claim 13, wherein
the traveling state change member includes a vehicle speed setting member and a forward-reverse switching operation member, and
the control device actuates the gear shift actuator in response to an operation of the vehicle speed setting member and actuates the clutch actuator so that switching between engagement and disengagement of the forward-side and reverse-side clutch mechanisms is performed in response to an operation of the forward-reverse switching operation member.

15. The transmission structure according to claim 13, wherein
the transmission mechanisms further include a traveling output shaft operatively coupled with the gear shift output shaft via the forward-side transmission mechanism and the reverse-side transmission mechanism, and
an output-side third transmission mechanism which is capable of operatively transmitting rotation power of the first element as forward drive force to the traveling output shaft and which has a gear ratio set such that a rotation speed of the traveling output shaft obtained when rotation power of the first element is operatively transmitted to the traveling output shaft via the output-side third transmission mechanism is higher than a rotation speed of the traveling output shaft obtained when the rotation power of the first element is operatively transmitted to the traveling output shaft via the output-side second transmission mechanism and the forward-side transmission mechanism, and
the clutch mechanisms further include an output-side third clutch mechanism which engages or disengages power transmission of the output-side third transmission mechanism.

16. A transmission structure interposed in a transmission path extending from a drive source to traveling wheels, the transmission structure comprising:
transmission mechanisms which have a plurality of shift gears, and which have a plurality of clutch mechanisms for selecting a desired shift gear from among the plurality of shift gears;
a clutch actuator that performs engagement and disengagement of the plurality of clutch mechanisms;
a continuously variable transmission mechanism that continuously varies rotation power in the plurality of shift gears;
a gear shift actuator that performs an operation of changing the continuously variable transmission mechanism;
a traveling state change member that is operable by a person; and
the control device that actuates the clutch actuator so as to realize a shift gear corresponding to a vehicle speed, and in addition, actuates the gear shift actuator in response to an operation of the traveling state change member,
wherein the control device
(1) actuates, when a power cut-off signal is input in a drive traveling state in a certain shift gear defined based on an operation direction of the traveling state change member and a vehicle speed, the clutch actuator so that only a clutch mechanism on a most downstream side in a transmission direction among the plurality of clutch mechanisms which realize a drive traveling state in the certain shift gear is brought to a disengaged state,
(2) determines, when the power cut-off signal is valid in a state in which the traveling state change member is operated in a forward or reverse direction, a presumed shift gear which corresponds to a traveling direction corresponding to the operation state of the traveling state change member and which corresponds to a vehicle speed at that time point, actuates the clutch actuator so that only the clutch mechanism on the most downstream side in the transmission direction among the plurality of clutch mechanisms which realize the presumed shift gear is brought to a disengaged state and the other clutch mechanisms are brought to the engaged state, and in addition, actuates the gear shift actuator so that an HST gear ratio which realizes a vehicle speed at that time point in the presumed shift gear is obtained, and
(3) actuates, when a cancel signal for canceling the power cut-off-signal is input in a state in which the traveling state change member is operated in a forward or reverse direction, the clutch actuator so that the clutch mechanism on the most downstream side in the transmission direction in the presumed shift gear at that time point is brought to an engaged state.

17. The transmission structure according to claim 16, wherein
the transmission mechanisms include a planetary gear mechanism which has a first element, a second element, and a third element which functions as an input section of a continuously variable transmission output, an input-side first transmission mechanism capable of operatively transmitting rotation power of the drive source to the first element with an input-side first gear ratio, an input-side second transmission mechanism capable of operatively transmitting rotation power of the drive source to the second element with an input-side second gear ratio, an output-side first transmission mechanism capable of operatively transmitting rotation power of the second element to a gear shift output shaft disposed on the downstream side in the transmission direction relative to the input-side first and second transmission mechanisms with an output-side first gear ratio, an output-side second transmission mechanism capable of operatively transmitting rotation power of the first element to the gear shift output shaft with an output-side second gear ratio, and a forward-side transmission mechanism and a reverse-side transmission mechanism which output the rotation power of the gear shift output shaft as forward drive force and reverse drive force to the traveling wheels,
the clutch mechanisms include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and a forward-side clutch mechanism and a reverse-side clutch mechanism which engage or disengage power transmission of the forward-side transmission mechanism and the reverse-side transmission mechanism, respectively and
the control device
(1) actuates the clutch actuator so that switching between engagement and disengagement of the forward-side and reverse-side clutch mechanisms is performed in response to an operation of the traveling state change member,
(2) actuates, when a vehicle speed is in a traveling first gear range, the clutch actuator such that a first transmission state in which the input-side first and second clutch mechanisms are brought to an engaged state and a disengaged state, respectively, so that the first element functions as a reference power input section which inputs reference rotation power from the drive source and the second element functions as a composite power output section which outputs composite rotation power to the gear shift output shaft is realized, and furthermore, the output-side first and second clutch mechanisms are brought to an engaged state and a disengaged state, respectively, so that rotation power of the second element is operatively transmitted to the gear shift output shaft, and
(3) actuates, when the vehicle speed is in a traveling second gear range of a speed higher than the traveling first gear range, the clutch actuator such that a second transmission state in which the input-side first and second clutch mechanisms are brought to a disengaged state and an engaged state, respectively, so that the second element functions as the reference power input section and the first element functions as the composite power output section is realized, and furthermore, the output-side first and second clutch mechanisms are brought to a disengaged state and an engaged state, respectively, so that rotation power of the first element is operatively transmitted to the gear shift output shaft.

18. The transmission structure according to claim 17, wherein
the traveling state change member includes a vehicle speed setting member and a forward-reverse switching operation member, and
the control device actuates the gear shift actuator in response to an operation of the vehicle speed setting member and actuates the clutch actuator so that switching between engagement and disengagement of the forward-side and reverse-side clutch mechanisms is performed in response to an operation of the forward-reverse switching operation member.

19. The transmission structure according to claim 17, wherein
the transmission mechanisms further include a traveling output shaft operatively coupled with the gear shift output shaft via the forward-side transmission mechanism and the reverse-side transmission mechanism, and an output-side third transmission mechanism which is capable of operatively transmitting rotation power of the first element as forward drive force to the traveling output shaft and which has a gear ratio set such that a rotation speed of the traveling output shaft obtained when rotation power of the first element is operatively transmitted to the traveling output shaft via the output-side third transmission mechanism is higher than a rotation speed of the traveling output shaft obtained when the rotation power of the first element is operatively transmitted to the traveling output shaft via the output-side second transmission mechanism and the forward-side transmission mechanism,
the clutch mechanisms further include an output-side third clutch mechanism which engages or disengages power transmission of the output-side third transmission mechanism, and
when the vehicle speed is in a traveling third gear range of a speed higher than the second gear range, the control device actuates the clutch actuator so that, in a state in which the second transmission state is realized, the output-side first and second clutch mechanisms are brought to a disengaged state, the output-side third clutch mechanism is brought to an engaged state, and the forward-side clutch mechanism is brought to a disengaged state.

20. The transmission structure according to claim 16, wherein
the power cut-off signal is a braking operation signal supplied from a braking operation member or a clutch cancel operation signal supplied from a clutch operation member.

21. A transmission structure interposed in a transmission path extending from a drive source to traveling wheels, the transmission structure comprising:
transmission mechanisms that include a forward-side clutch mechanism and a reverse-side clutch mechanism which are capable of realizing a forward drive traveling state in which the traveling wheels are driven in a forward direction and a reverse drive traveling state in which the traveling wheels are driven in a reverse direction, respectively, and a plurality of clutch mechanisms which have a plurality of shift gears and which are used to select a desired shift gear from among the plurality of shift gears;

a clutch actuator that performs an engagement operation and a disengagement operation of the plurality of clutch mechanisms;

a continuously variable transmission mechanism that continuously varies rotation power in the plurality of shift gears;

a gear shift actuator that performs an operation of changing the continuously variable transmission mechanism;

a traveling state change member that is operable by a person; and a control device that actuates the clutch actuator so as to realize a shift gear which corresponds to a traveling direction corresponding to a forward-reverse operation of the traveling state change member and which corresponds to a vehicle speed, and in addition, actuates the shift gear actuator in response to a gear shift operation of the traveling state change member, wherein the control device (1) actuates, when receiving a neutral signal based on a neutral operation shifted from a forward operation or a reverse operation of the traveling state change member, the clutch actuator so that both the forward-side clutch mechanism and the reverse-side clutch mechanism are brought to a disengaged state, (2) determines, while the neutral signal is valid, a presumed shift gear corresponding to a vehicle speed at that time point, actuates the clutch actuator so that the disengaged state of the forward-side clutch mechanism and the reverse-side clutch mechanism is maintained and the plurality of clutch mechanisms, other than the forward-side clutch mechanism and the reverse-side clutch mechanism, which realize the presumed shift gear are brought to an engaged state, and in addition, actuates the gear shift actuator so as to obtain an HST gear ratio which realizes the vehicle speed at that time point in the presumed shift gear, (3) actuates, when the traveling state change member is operated in the forward direction or the reverse direction, the clutch actuator so that the forward-side clutch mechanism or the reverse-side clutch mechanism corresponding to the operation direction of the traveling state change member is brought to an engaged state in accordance with the operation direction of the traveling state change member.

22. The transmission structure according to claim 21, wherein the transmission mechanisms include a planetary gear mechanism which has a first element, a second element, and a third element which functions as an input section of a continuously variable transmission output, an input-side first transmission mechanism capable of operatively transmitting rotation power of the drive source to the first element with an input-side first gear ratio, an input-side second transmission mechanism capable of operatively transmitting rotation power of the drive source to the second element with an input-side second gear ratio, an output-side first transmission mechanism capable of operatively transmitting rotation power of the second element to a gear shift output shaft disposed on the downstream side in the transmission direction relative to the input-side first and second transmission mechanisms with an output-side first gear ratio, and an output-side second transmission mechanism capable of operatively transmitting rotation power of the first element to the gear shift output shaft with an output-side second gear ratio, the forward-side and reverse-side clutch mechanisms output the rotation power of the gear shift output shaft as forward drive power and reverse drive power, respectively, to the traveling wheels, the clutch mechanisms include input-side first and second clutch mechanisms which engage or disengage power transmission of the input-side first and second transmission mechanisms, respectively, output-side first and second clutch mechanisms which engage or disengage power transmission of the output-side first and second transmission mechanisms, respectively, and a forward-side clutch mechanism and a reverse-side clutch mechanism which engage or disengage power transmission of the forward-side transmission mechanism and the reverse-side transmission mechanism, respectively, and the control device (1) actuates the clutch actuator so that switching between engagement and disengagement of the forward-side and reverse-side clutch mechanisms is performed in response to a forward-reverse operation of the traveling state change member, (2) actuates, when a vehicle speed is in a traveling first gear range, the clutch actuator such that a first transmission state in which the input-side first and second clutch mechanisms are brought to an engaged state and a disengaged state, respectively, so that the first element functions as a reference power input section which inputs reference rotation power from the drive source and the second element functions as a composite power output section which outputs composite rotation power to the gear shift output shaft is realized, and furthermore, the output-side first and second clutch mechanisms are brought to an engaged state and a disengaged state, respectively, so that rotation power of the second element is operatively transmitted to the gear shift output shaft, and (3) actuates, when the vehicle speed is in a traveling second gear range of a speed higher than the traveling first gear range, the clutch actuator such that a second transmission state in which the input-side first and second clutch mechanisms are brought to a disengaged state and an engaged state, respectively, so that the second element functions as the reference power input section and the first element functions as the composite power output section is realized, and furthermore, the output-side first and second clutch mechanisms are brought to a disengaged state and an engaged state, respectively, so that rotation power of the first element is operatively transmitted to the gear shift output shaft.

23. The transmission structure according to claim 22, wherein the traveling state change member includes a vehicle speed setting member and a forward-reverse switching operation member, and the control device actuates the gear shift actuator in response to an operation of the vehicle speed setting member and actuates the clutch actuator so that switching between engagement and disengagement of the forward-side and reverse-side clutch mechanisms is performed in response to an operation of the forward-reverse switching operation member.

* * * * *